US012634813B2

(12) United States Patent
Abotabl et al.

(10) Patent No.: US 12,634,813 B2
(45) Date of Patent: May 19, 2026

(54) DYNAMIC ADAPTATION OF A SLEEP CYCLE FOR A CELL

(71) Applicant: QUALCOMM Incorporated, San Diego, CA (US)

(72) Inventors: Ahmed Attia Abotabl, San Diego, CA (US); Marwen Zorgui, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 446 days.

(21) Appl. No.: 18/069,984

(22) Filed: Dec. 21, 2022

(65) Prior Publication Data

US 2024/0214923 A1 Jun. 27, 2024

(51) Int. Cl.
| | |
|---|---|
| *H04W 4/00* | (2018.01) |
| *H04W 52/02* | (2009.01) |
| *H04W 72/04* | (2023.01) |
| *H04W 72/232* | (2023.01) |

(52) U.S. Cl.
CPC ....... *H04W 52/0206* (2013.01); *H04W 72/04* (2013.01); *H04W 72/232* (2023.01)

(58) Field of Classification Search
CPC ........... H04W 52/0206; H04W 72/232; H04W 72/04
See application file for complete search history.

(56) References Cited

U.S. PATENT DOCUMENTS

| | | | |
|---|---|---|---|
| 2020/0053646 A1* | 2/2020 | Kuo | H04W 8/005 |
| 2020/0112917 A1* | 4/2020 | Nam | H04W 52/0235 |

| | | | |
|---|---|---|---|
| 2021/0377857 A1* | 12/2021 | Wu | H04W 52/0219 |
| 2022/0060986 A1* | 2/2022 | Tie | H04W 72/0453 |
| 2023/0015708 A1* | 1/2023 | Gurumoorthy | H04W 68/025 |
| 2023/0171698 A1* | 6/2023 | Wei | H04W 72/23 370/318 |

OTHER PUBLICATIONS

Interdigital Inc: "Potential Techniques for Network Energy Saving", R1-2206666, 3rd Generation Partnership Project, Mobile Competence Centre, 650, Route Des Lucioles, F-06921 Sophia-Antipolis Cedex, France, vol. RAN WG1, No. Toulouse, FR, Aug. 22, 2022-Aug. 26, 2022, Aug. 12, 2022, 14 pages, XP052274594, the whole document.

(Continued)

*Primary Examiner* — Abdelnabi O Musa
(74) *Attorney, Agent, or Firm* — Holland & Hart LLP/QUALCOMM Incorporated

(57) ABSTRACT

Methods, systems, and devices for wireless communications are described. A communications device such as a user equipment (UE) may receive control signaling that indicates a sleep cycle of a network entity over which the network entity alternates between an active time duration and an inactive time duration. In some examples, the control signaling may indicate a wakeup signal (WUS) occasion within a first active time duration of the sleep cycle for communication of a WUS and a time and frequency resource within the first active time duration of the sleep cycle that occurs after the wakeup signal occasion. The UE may monitor and receive, via the time and frequency resource, a first control message including an indication of a dynamic adaptation to the sleep cycle and indicating the power state of the network entity.

30 Claims, 18 Drawing Sheets

(56)                      References Cited

OTHER PUBLICATIONS

International Search Report and Written Opinion—PCT/US2023/083625—ISA/EPO—Apr. 30, 2024.

Kim (Samsung) Y., et al., "Network Energy Saving Techniques", 3GPP TSG RAN WG1 #111, R1-2212057, 3GPP, Mobile Competence Centre, 650, Route Des Lucioles, F-06921 Sophia-Antipolis Cedex, France, vol. 3GPP RAN 1, No. Toulouse, FR, Nov. 14, 2022-Nov. 18, 2022, Nov. 7, 2022, 22 pages, XP052222622, 3.3 Adaptation of DTX/DRX, p. 4 3.4 Wake up of gNB triggered by UE wake up signal (WUS), p. 5 7 Conclusion, p. 17.

Pan (VIVO) X., et al., "Discussions on Network Energy Saving Technique", 3GPP TSG RAN WG1 #111, R1-2211019, 3GPP, Mobile Competence Centre, 650, Route Des Lucioles, F-06921 Sophia-Antipolis Cedex, France, vol. 3GPP RAN 1, No. Toulouse, FR, Nov. 14, 2022-Nov. 18, 2022, Nov. 7, 2022, 40 pages, XP052221584, 2.2. Technique A-2: Dynamic adaptation of UE specific signals and channels, p. 5, 2.3. Technique A-3: Wake up of gNB triggered by UE wake up signal (WUS), p. 6-p. 13, 2.4. Technique A-4: Adaptation of DTX/DRX, p. 13-p. 16.

Chochliouros I.P., et al., "Energy Efficiency Concerns and Trends in Future 5G Network Infrastructures", Energies, vol. 14, No. 17, Article No. 5392, Aug. 30, 2021, pp. 1-14.

Hatt T., et al., "GSMA Intelligence, 5G Energy Efficiencies, Green is the New Black", Nov. 2020, 26 Pages.

HUAWEI: "New SI: Study on Network Energy Savings For NR", 3GPP TSG RAN Meeting #94e, RP-213554 (revision of RP-212709), Electronic Meeting, Dec. 6-17, 2021, Dec. 10, 2021, 16 Pages.

\* cited by examiner

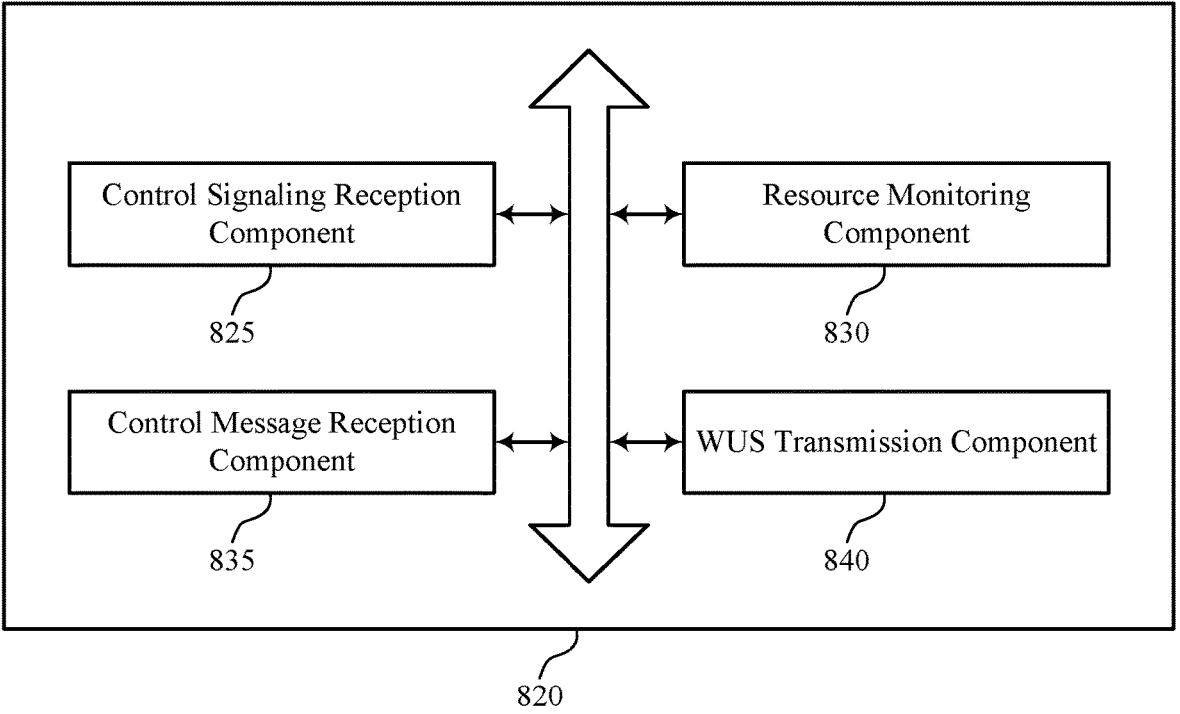
Control Signaling Reception Component
825
Resource Monitoring Component
830
Control Message Reception Component
835
WUS Transmission Component
840
820
800
FIG. 8

130 105 115

Network
Entity

Transceiver

1310

Antenna

1315

Communications
Manager

1320

Memory

Code

1330

1325

1340

Processor

1335

1305

1300

Figure 14:
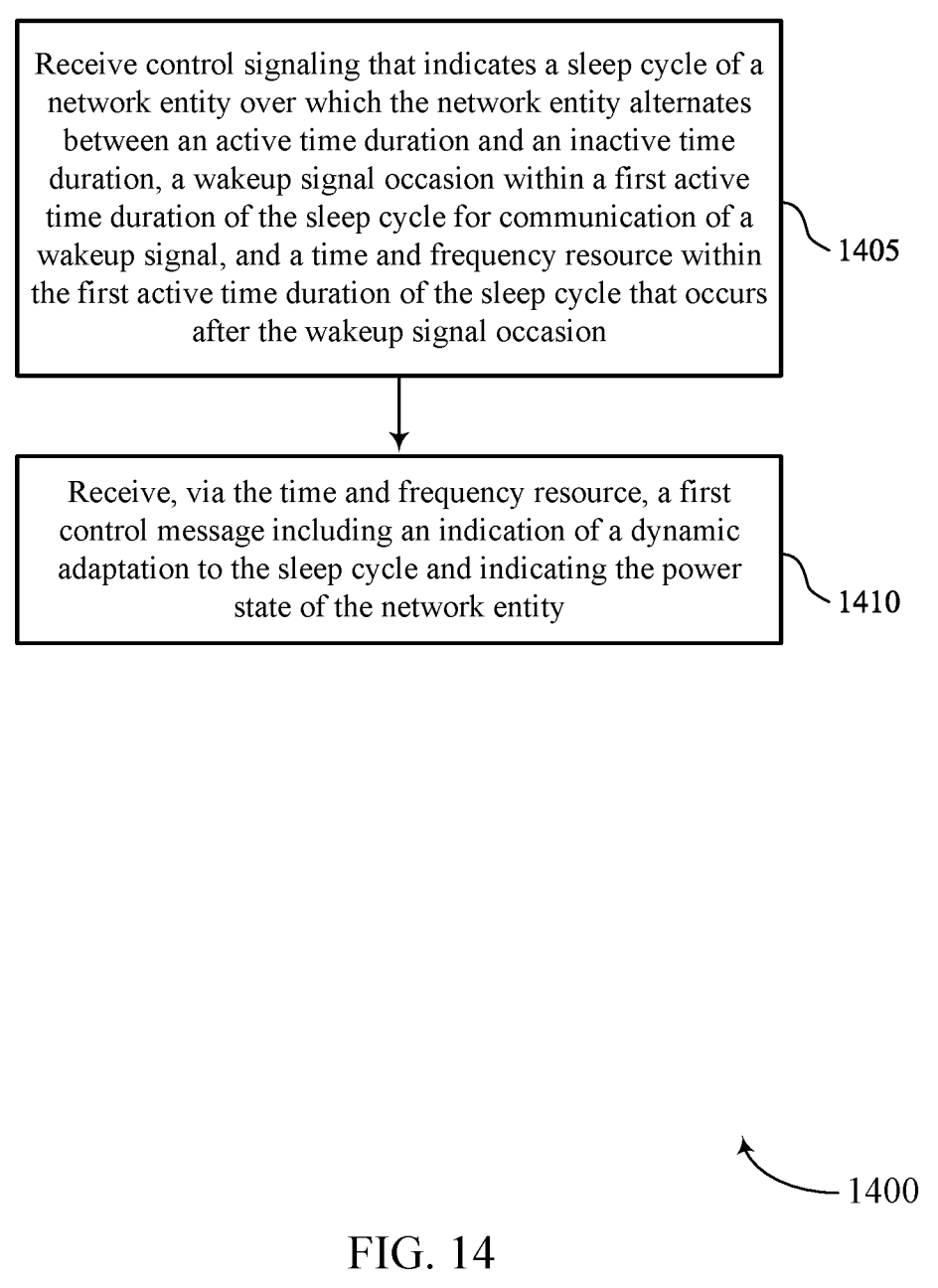

Receive control signaling that indicates a sleep cycle of a network entity over which the network entity alternates between an active time duration and an inactive time duration, a wakeup signal occasion within a first active time duration of the sleep cycle for communication of a wakeup signal, and a time and frequency resource within the first active time duration of the sleep cycle that occurs after the wakeup signal occasion

1405

Receive, via the time and frequency resource, a first control message including an indication of a dynamic adaptation to the sleep cycle and indicating the power state of the network entity

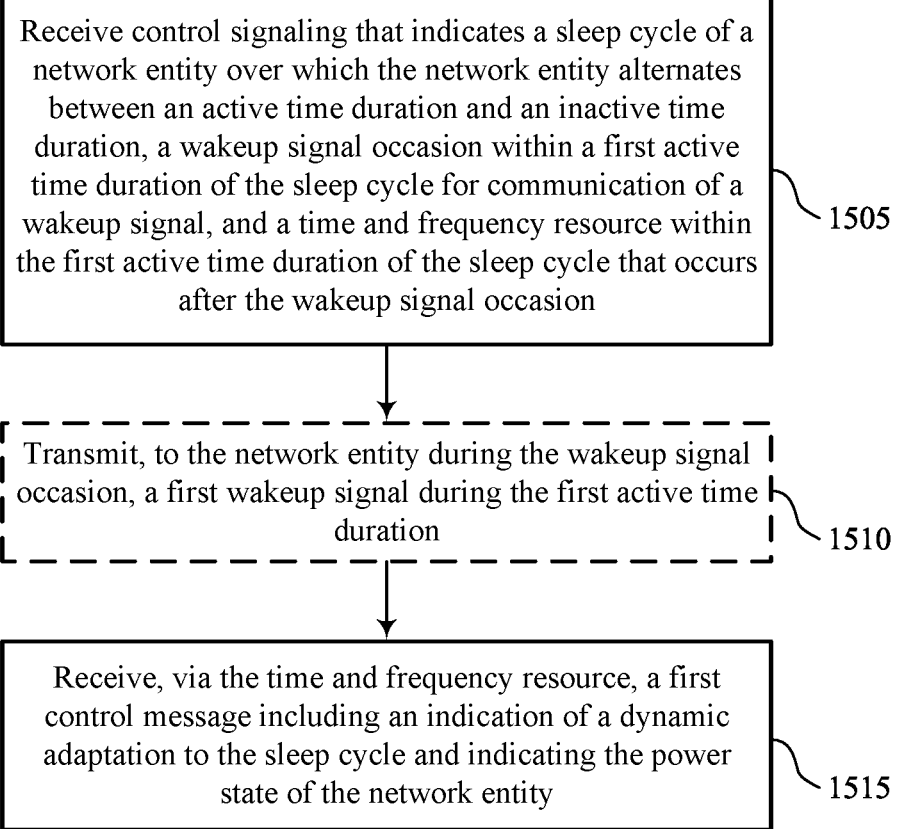

Receive control signaling that indicates a sleep cycle of a network entity over which the network entity alternates between an active time duration and an inactive time duration, a wakeup signal occasion within a first active time duration of the sleep cycle for communication of a wakeup signal, and a time and frequency resource within the first active time duration of the sleep cycle that occurs after the wakeup signal occasion

1505

Transmit, to the network entity during the wakeup signal occasion, a first wakeup signal during the first active time duration

1510

Receive, via the time and frequency resource, a first control message including an indication of a dynamic adaptation to the sleep cycle and indicating the power state of the network entity

Figure 16:
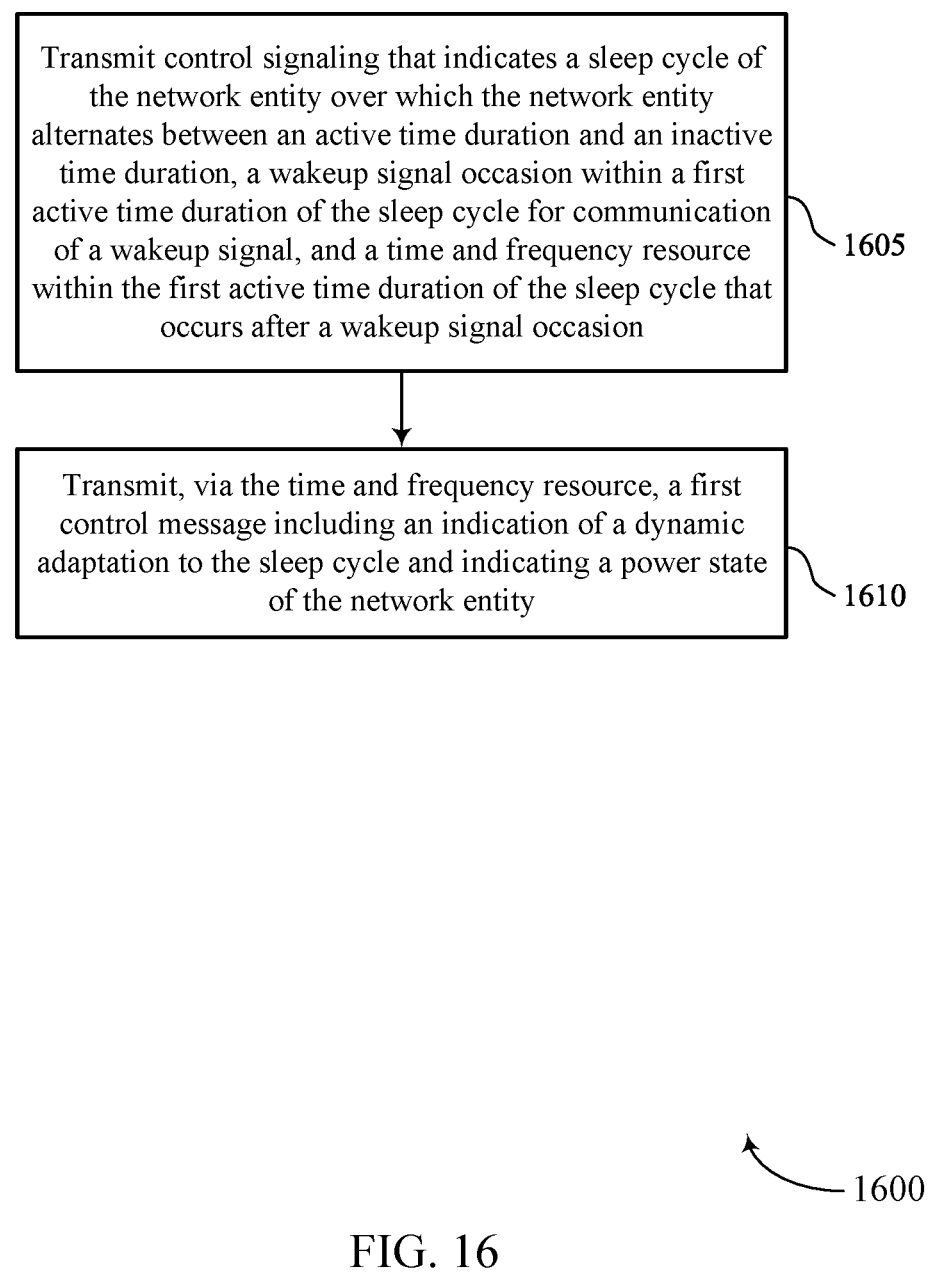

Transmit control signaling that indicates a sleep cycle of the network entity over which the network entity alternates between an active time duration and an inactive time duration, a wakeup signal occasion within a first active time duration of the sleep cycle for communication of a wakeup signal, and a time and frequency resource within the first active time duration of the sleep cycle that occurs after a wakeup signal occasion

1605

Transmit, via the time and frequency resource, a first control message including an indication of a dynamic adaptation to the sleep cycle and indicating a power state of the network entity

Figure 17:
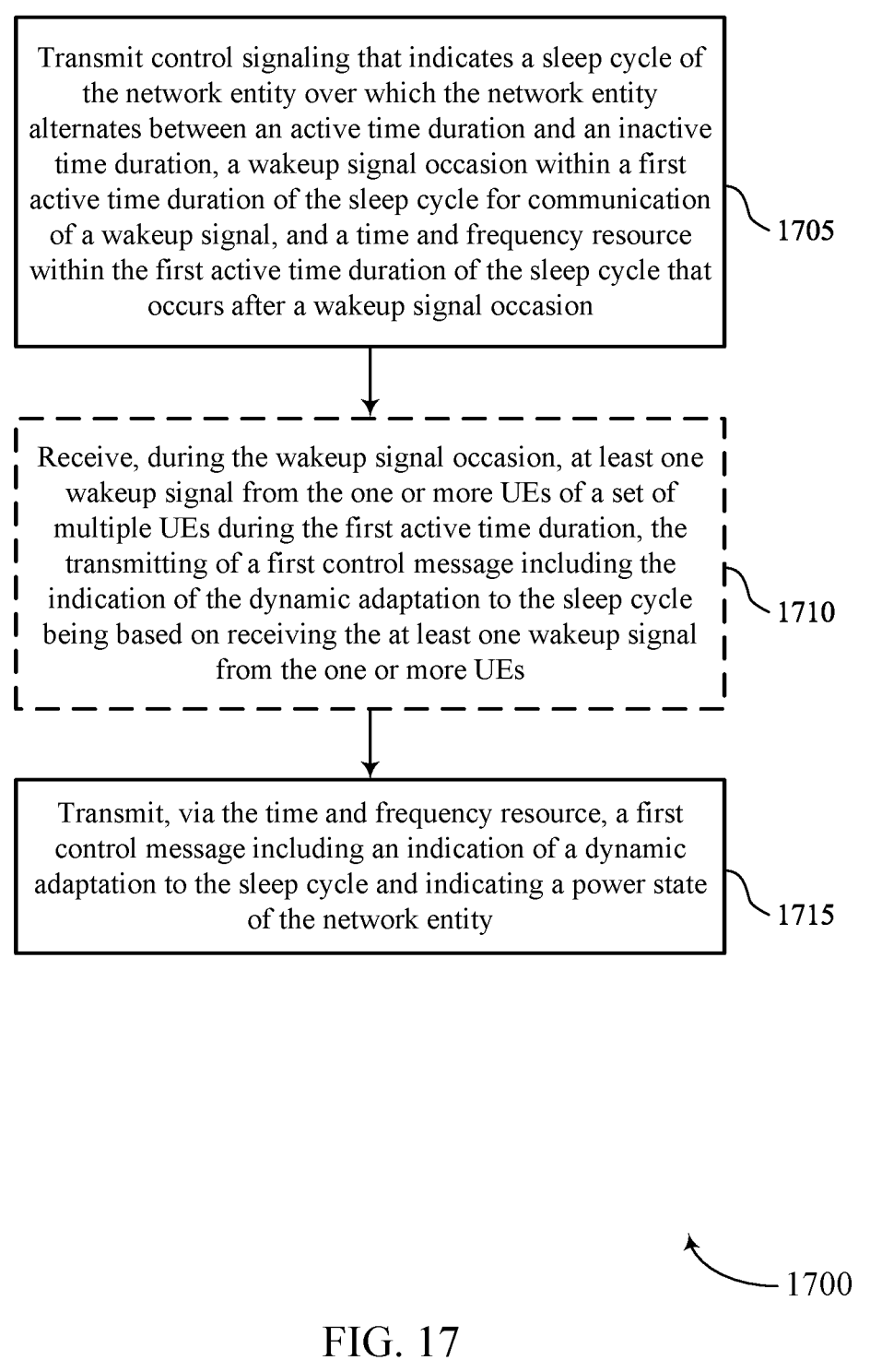

Transmit control signaling that indicates a sleep cycle of the network entity over which the network entity alternates between an active time duration and an inactive time duration, a wakeup signal occasion within a first active time duration of the sleep cycle for communication of a wakeup signal, and a time and frequency resource within the first active time duration of the sleep cycle that occurs after a wakeup signal occasion

1705

Receive, during the wakeup signal occasion, at least one wakeup signal from the one or more UEs of a set of multiple UEs during the first active time duration, the transmitting of a first control message including the indication of the dynamic adaptation to the sleep cycle being based on receiving the at least one wakeup signal from the one or more UEs

1710

Transmit, via the time and frequency resource, a first control message including an indication of a dynamic adaptation to the sleep cycle and indicating a power state of the network entity

DYNAMIC ADAPTATION OF A SLEEP CYCLE FOR A CELL

INTRODUCTION

The following relates to wireless communications, and more specifically to managing dynamic adaptations of a sleep cycle for a cell.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

A method for wireless communications at a UE is described. The method may include receiving control signaling that indicates a sleep cycle of a network entity over which the network entity alternates between an active time duration and an inactive time duration, a wakeup signal (WUS) occasion within a first active time duration of the sleep cycle for communication of a WUS, and a time and frequency resource within the first active time duration of the sleep cycle that occurs after the WUS occasion. In some examples, the UE may receive, via the time and frequency resource, a first control message including an indication of a dynamic adaptation to the sleep cycle and indicating the power state of the network entity.

An apparatus for wireless communications at a UE is described. The apparatus may include a processor, memory coupled with the processor, and instructions stored in the memory. The instructions may be executable by the processor to cause the apparatus to receive control signaling that indicates a sleep cycle of a network entity over which the network entity alternates between an active time duration and an inactive time duration, a WUS occasion within a first active time duration of the sleep cycle for communication of a WUS, and a time and frequency resource within the first active time duration of the sleep cycle that occurs after the WUS occasion. In some examples, the processor may be configured to receive, via the time and frequency resource, a first control message including an indication of a dynamic adaptation to the sleep cycle and indicating a power state of the network entity.

Another apparatus for wireless communications at a UE is described. The apparatus may include means for receiving control signaling that indicates a sleep cycle of a network entity over which the network entity alternates between an active time duration and an inactive time duration, a WUS occasion within a first active time duration of the sleep cycle for communication of a WUS, and a time and frequency resource within the first active time duration of the sleep cycle for communication of a WUS, and a time and frequency resource within the first active time duration of the sleep cycle that occurs after the WUS occasion. In some examples, the apparatus may include means for receiving, via the time and frequency resource, a first control message including an indication of a dynamic adaptation to the sleep cycle and indicating a power state of the network entity.

A non-transitory computer-readable medium storing code for wireless communications at a UE is described. The code may include instructions executable by a processor to receive control signaling that indicates a sleep cycle of a network entity over which the network entity alternates between an active time duration and an inactive time duration, a WUS occasion within a first active time duration of the sleep cycle for communication of a WUS, and a time and frequency resource within the first active time duration of the sleep cycle that occurs after the WUS occasion. In some examples, the code may include instructions further executable by the processor to receive, via the time and frequency resource, a first control message including an indication of a dynamic adaptation to the sleep cycle and indicating a power state of the network entity.

Some examples of the method, apparatuses, and non-transitory computer-readable medium described herein may further include operations, features, means, or instructions for monitoring, via the time and frequency resource, for the first control message indicating the power state of the network entity.

Some examples of the method, apparatuses, and non-transitory computer-readable medium described herein may further include operations, features, means, or instructions for transmitting, to the network entity during the WUS occasion, a first WUS during the first active time duration, the receiving of the first control message including the indication of the dynamic adaptation to the sleep cycle may be based on transmitting the first WUS.

Some examples of the method, apparatuses, and non-transitory computer-readable medium described herein may further include operations, features, means, or instructions for receiving, via the time and frequency resource, a time offset indication that indicates a time shift to the active time duration of the sleep cycle.

Some examples of the method, apparatuses, and non-transitory computer-readable medium described herein may further include operations, features, means, or instructions for receiving, via the time and frequency resource, a time duration increase indication that indicates an increased time duration of an upcoming instance of the active time duration of the sleep cycle.

Some examples of the method, apparatuses, and non-transitory computer-readable medium described herein may further include operations, features, means, or instructions for receiving the dynamic adaptation that indicates a quantity of instances of the active time duration of the sleep cycle.

Some examples of the method, apparatuses, and non-transitory computer-readable medium described herein may further include operations, features, means, or instructions for receiving, the first control message including the indication of the dynamic adaptation to the sleep cycle, the downlink control information (DCI) including one or more bit values that indicates a type of the dynamic adaptation of the sleep cycle.

Some examples of the method, apparatuses, and non-transitory computer-readable medium described herein may further include operations, features, means, or instructions for receiving, a second control message including an indication of a table that associates respective bit values to a respective type of dynamic adaptation of the sleep cycle of a set of multiple dynamic sleep cycle adaptation types.

Some examples of the method, apparatuses, and non-transitory computer-readable medium described herein may further include operations, features, means, or instructions for receiving the first control message via a physical downlink shared channel (PDSCH).

A method for wireless communications at a network entity is described. The method may include transmitting control signaling that indicates a sleep cycle of the network entity over which the network entity alternates between an active time duration and an inactive time duration, a WUS occasion within a first active time duration of the sleep cycle for communication of a WUS, and a time and frequency resource within the first active time duration of the sleep cycle that occurs after a WUS occasion. In some examples, the network entity may transmit, via the time and frequency resource, a first control message including an indication of a dynamic adaptation to the sleep cycle and indicating a power state of the network entity.

An apparatus for wireless communications at a network entity is described. The apparatus may include a processor, memory coupled with the processor, and instructions stored in the memory. The instructions may be executable by the processor to cause the apparatus to transmit control signaling that indicates a sleep cycle of the network entity over which the network entity alternates between an active time duration and an inactive time duration, a WUS occasion within a first active time duration of the sleep cycle for communication of a WUS, and a time and frequency resource within the first active time duration of the sleep cycle that occurs after a WUS occasion. In some examples, the processor to may further cause the apparatus to transmit, via the time and frequency resource, a first control message including an indication of a dynamic adaptation to the sleep cycle and indicating a power state of the network entity.

Another apparatus for wireless communications at a network entity is described. The apparatus may include means for transmitting control signaling that indicates a sleep cycle of the network entity over which the network entity alternates between an active time duration and an inactive time duration, a WUS occasion within a first active time duration of the sleep cycle for communication of a WUS, and a time and frequency resource within the first active time duration of the sleep cycle that occurs after a WUS occasion. In some examples, the apparatus may further include means for transmitting, via the time and frequency resource, a first control message including an indication of a dynamic adaptation to the sleep cycle and indicating a power state of the network entity.

A non-transitory computer-readable medium storing code for wireless communications at a network entity is described. The code may include instructions executable by a processor to transmit control signaling that indicates a sleep cycle of the network entity over which the network entity alternates between an active time duration and an inactive time duration, a WUS occasion within a first active time duration of the sleep cycle for communication of a WUS, and a time and frequency resource within the first active time duration of the sleep cycle that occurs after a WUS occasion. In some examples, the code may further include instructions executable by the processor to transmit, via the time and frequency resource, a first control message including an indication of a dynamic adaptation to the sleep cycle and indicating a power state of the network entity.

Some examples of the method, apparatuses, and non-transitory computer-readable medium described herein may further include operations, features, means, or instructions for monitoring, via the time and frequency resource, for a wake up signal from one or more UEs.

Some examples of the method, apparatuses, and non-transitory computer-readable medium described herein may further include operations, features, means, or instructions for receiving, during the WUS occasion, at least one WUS from the one or more UEs of a set of multiple UEs during the first active time duration, the transmitting of the first control message including the indication of the dynamic adaptation to the sleep cycle being based on receiving the at least one WUS from the one or more UEs.

Some examples of the method, apparatuses, and non-transitory computer-readable medium described herein may further include operations, features, means, or instructions for transmitting, via the time and frequency resource, a time offset indication that indicates a time shift to an upcoming instance of the active time duration of the sleep cycle.

Some examples of the method, apparatuses, and non-transitory computer-readable medium described herein may further include operations, features, means, or instructions for transmitting, via the time and frequency resource, a time duration increase indication that indicates an increased time duration of an upcoming instance of the active time duration of the sleep cycle.

Some examples of the method, apparatuses, and non-transitory computer-readable medium described herein may further include operations, features, means, or instructions for transmitting the dynamic adaptation that indicates a quantity of instances of the active time duration of the sleep cycle.

Some examples of the method, apparatuses, and non-transitory computer-readable medium described herein may further include operations, features, means, or instructions for transmitting, the first control message including the indication of the dynamic adaptation to the sleep cycle, the DCI including one or more bit values that indicates a type of the dynamic adaptation of the sleep cycle.

Some examples of the method, apparatuses, and non-transitory computer-readable medium described herein may further include operations, features, means, or instructions for transmitting, a second control message including an indication of a table that associates respective bit values to a respective type of dynamic adaptation of the sleep cycle of a set of multiple dynamic sleep cycle adaptation types.

Some examples of the method, apparatuses, and non-transitory computer-readable medium described herein may further include operations, features, means, or instructions for transmitting the first control message via a PDSCH.

BRIEF DESCRIPTION OF THE DRAWINGS

FIG. 8 illustrates a block diagram of a communications manager that supports dynamic adaptation of a sleep cycle for a cell in accordance with one or more aspects of the present disclosure.

FIGS. 14 through 17 illustrate flowcharts showing methods that support dynamic adaptation of a sleep cycle for a cell in accordance with one or more aspects of the present disclosure.

DETAILED DESCRIPTION

Figure 1:
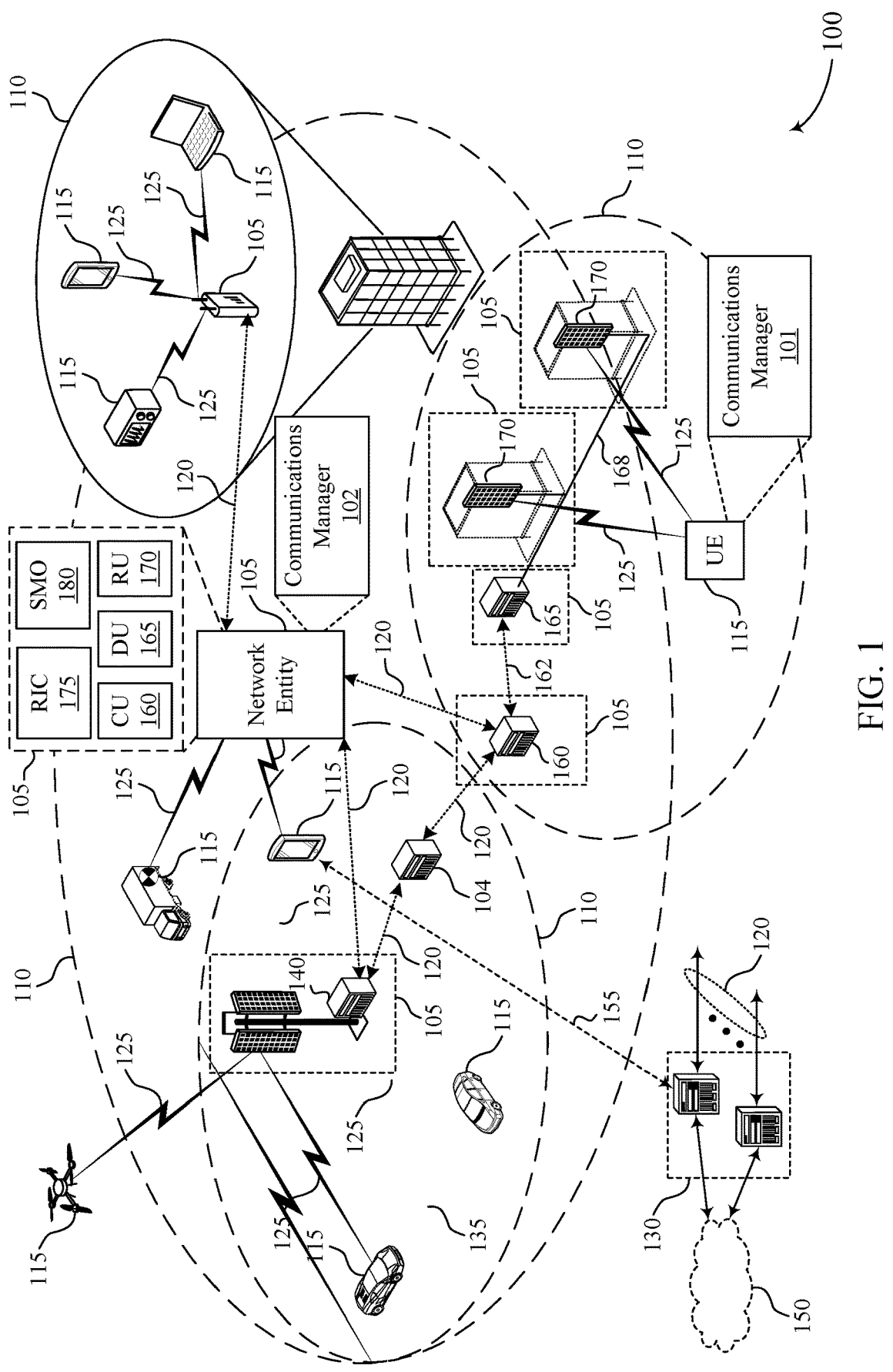
FIG. 1 through 4 illustrate examples of wireless communications systems that supports dynamic adaptation of a sleep cycle for a cell in accordance with one or more aspects of the present disclosure.

Some wireless communications systems may implement energy saving techniques to improve network signaling overhead and energy expenditure. For example, a network entity may operate in accordance with different power modes to save power and maintain network operation. The network may enter different sleep modes based on the level of traffic (e.g., active operation, light sleep, deep sleep). In examples of active operation, the network entity may be actively monitoring and communicating with one or more wireless devices. In examples of light sleep, the network entity may be monitoring for traffic from one or more wireless devices, and may refrain from actively transmitting to the one or more wireless devices. In examples of deep sleep, the network entity may refrain from monitoring or communicating with the one or more wireless devices for a configured time duration. As such, the different sleep modes may have different levels of power consumption and have different associated transition times. During various durations of the day, the level of traffic at the network entity may be below a configured threshold. In such cases, the network entity may operate in accordance with one or more of the sleep modes (e.g., light sleep or deep sleep) to decrease power consumption. However, during operations of the day where traffic is below the configured threshold, the network entity may still periodically transmit broadcast signals (e.g., a synchronization signal block (SSB) or system information (SI)) to the one or more associated UEs. Additionally, or alternatively, the network entity may periodically monitor physical random access channel (PRACH) occasions for possible random access channel (RACH) or small data transmissions (SDTs) from the one or more UEs. As such, while in a sleep mode the network entity may monitor whether one or more UEs are requesting (via a wake-up signal (WUS)) for the network entity to go into connected state or perform one or more operations. For instance, a WUS may be an example of a signal from a UE that may indicate to the network entity to transition into a connected state to perform one or more operations (e.g., receive or transmit data with the UE). However, if the network entity transitions to an active operation each time the network entity receives a WUS from a UE, the network may experience a decrease in power saving capabilities and an increase in data traffic.

To support power saving capabilities at the network entity, the network entity may dynamically adapt the sleep schedule based on the WUS signals received from the one or more UEs. For example, the network entity may transmit control signaling that indicates a sleep cycle of the network entity. The sleep cycle may indicate a duration of time over which the network entity alternates between an active time duration (e.g., a duration of time in which the network entity may be in an active operation) and an inactive time duration (e.g., a duration of time in which the network entity may be in a light sleep mode or a deep sleep mode). In some examples, the sleep cycle may also include WUS occasions during one or more active time durations. During the WUS occasions the network entity may monitor for WUS signals from the one or more UEs. Based on the information included in the one or more received WUS signals, the network entity may determine to dynamically adapt the sleep cycle. For example, the network entity may transmit a first control message including an indication of the dynamic adaptation to the sleep cycle and indicating the power state of the network entity.

In some examples, the dynamic adaptation to the sleep cycle, sent by the network entity, may indicate a time shift to the active time duration of the sleep cycle. Additionally, or alternatively, the dynamic adaptation to the sleep cycle, sent by the network entity, may indicate an increased time duration of an upcoming instance of the active time duration of the sleep cycle. In some examples, the network entity may indicate for the receiving UEs to apply the dynamic adaptation to a quantity of instances sleep cycles.

In some examples, the network entity may indicate for the UEs to apply multiple types of dynamic adaptations of the sleep cycle (e.g., a time shift to the active time duration and an increase time duration of an upcoming active time duration). As such, the network entity may transmit a second control message including an indication of a table that associates respective bit values to a respective type of dynamic adaptation of the sleep cycle.

Such dynamic adaptations of the network entity sleep cycle may improve overall network signaling overhead and power expenditure. For example, the network may reduce the quantity of WUS occasions, which may decrease the amount of WUSs transmitted by UEs resulting in a decrease in UE traffic and a decrease in power consumption at the UEs. In addition, the described techniques may reduce a duration of time that the network entity is operating in an active mode, which may decrease power consumption at network entity. Additionally, or alternatively, the techniques described herein may support enhanced coordination between wireless devices and may increase the continuity and reliability of WUS communications between the network entity and the UEs.

Aspects of the disclosure are initially described in the context of wireless communications systems. Aspects of the disclosure are further illustrated by and described with reference to a process flow, apparatus diagrams, system diagrams, and flowcharts that relate to dynamic adaptation of a sleep cycle for a cell.

FIG. 1 illustrates an example of a wireless communications system 100 that supports dynamic adaptation of a sleep cycle for a cell in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature, and may include a network entity communications manager 102. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs) using UE communications manager 101.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE being configured to receive information from a network entity also discloses that a first network node being configured to receive information from a second network node, the first network node may refer to a first UE, a first base station, a first apparatus, a first device, a first computing system, a first one or more components, a first processing entity, or the like configured to receive the information; and the second network node may refer to a second UE, a second base station, a second apparatus, a second device, a second computing system, a second one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support CG and SPS for frequent BWP and CC switching as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a BWP (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink CCs and one or more uplink CCs according to a carrier aggregation configuration. Carrier aggregation may be used with both frequency division duplexing (FDD) and time division duplexing (TDD) CCs. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum, and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s = 1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

The electromagnetic spectrum is often subdivided, based on frequency/wavelength, into various classes, bands, channels, etc. In 5G NR two initial operating bands have been identified as frequency range designations FR1 (410 MHz- 7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regards to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell may cover a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple CCs.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with CCs operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

In some wireless communications networks, a UE 115, and a network entity 105 may consume a certain amount of energy to communicate within a radio access network (RAN). For example, in a network entity energy consumption model, the total energy consumption may be based on a relative energy consumption for downlink and uplink transmissions, sleep states associated with the network entity 105, associated transition times of the sleep states, and one or more reference parameters or configurations. The total energy consumption may be further based on factors such as power added (PA) efficiency, number of transmission radio units (TxRUs), and the network entity load of a network entity 105. In this example, communications within a cellular network (e.g., a high traffic scenario) may be associated with a high cost of network energy consumption (e.g., 23% of total cost). The network energy consumption may be evaluated based on assessing network entity and UE communications (e.g., spectral efficiency, capacity, user perceived throughput (UPT), latency, handover performance, call drop rate, initial access performance, service level agreement (SLA) assurance related key performance indicator (KPIs), etc.), energy efficiency, and UE power consumption. For example, multiple KPIs may be evaluated for a network. In this case, performing communications within RAN uses a majority of the network energy consumption (e.g., running a 5G network uses up around 50% of the network energy). The high cost of network energy consumption associated with the RAN may result in increased latency in communications and may result in an inability to expand cellular networks.

In some examples, the UE 115 and the network entity 105 may implement network energy saving (NES) techniques in order to save power and maintain network operations. For example, the network entity 105 may enter different sleep states based on the current traffic level (or future predicted traffic levels) in a network. Transitioning from a light sleep state to a baseline state may take a relatively longer amount of time than transitioning from a deep sleep state to the baseline state.

To support power saving capabilities at a network entity 105, the network entity 105 may dynamically adapt the sleep schedule based on the WUS signals received from the one or more UEs 115. For example, the network entity 105 may transmit control signaling that indicates a sleep cycle of the network entity 105. The sleep cycle may indicate a duration of time over which the network entity alternates between an active time duration and an inactive time duration. In some examples, the sleep cycle may also include WUS occasions during one or more active time durations. During the WUS occasions the network entity 105 may monitor for WUS signals from the one or more UEs 115. Based on the information included in the one or more received WUS signals, the network entity 105 may determine to dynamically adapt the sleep cycle. For example, the network entity 105 may transmit a first control message including an indication of the dynamic adaptation to the sleep cycle and indicating the power state of the network entity 105.

In some examples, receiving the dynamic adaptation to the sleep cycle may include receiving a time offset indication that indicates a time shift to the active time duration of the sleep cycle. Additionally, or alternatively, receiving the dynamic adaptation to the sleep cycle may include receiving a time duration increase indication that indicates an increased time duration of an upcoming instance of the active time duration of the sleep cycle. In some examples, the dynamic adaptation may indicate a quantity of instances of the active time duration of the sleep cycle that the dynamic adaptation may be applied to.

In some examples, the first control message may be an example of a DCI message. In such examples, the first control message may include one or more bit values that indicates a type of the dynamic adaptation of the sleep cycle. In some examples, the DCI may indicate multiple types of dynamic adaptations of the sleep cycle, where each of the multiple types of dynamic adaptations may be applied to the sleep cycle. As such, the network entity 105 may transmit a second control message including an indication of a table that associates respective bit values to a respective type of dynamic adaptation of the sleep cycle of a quantity of dynamic sleep cycle adaptation types.

Figure 2:
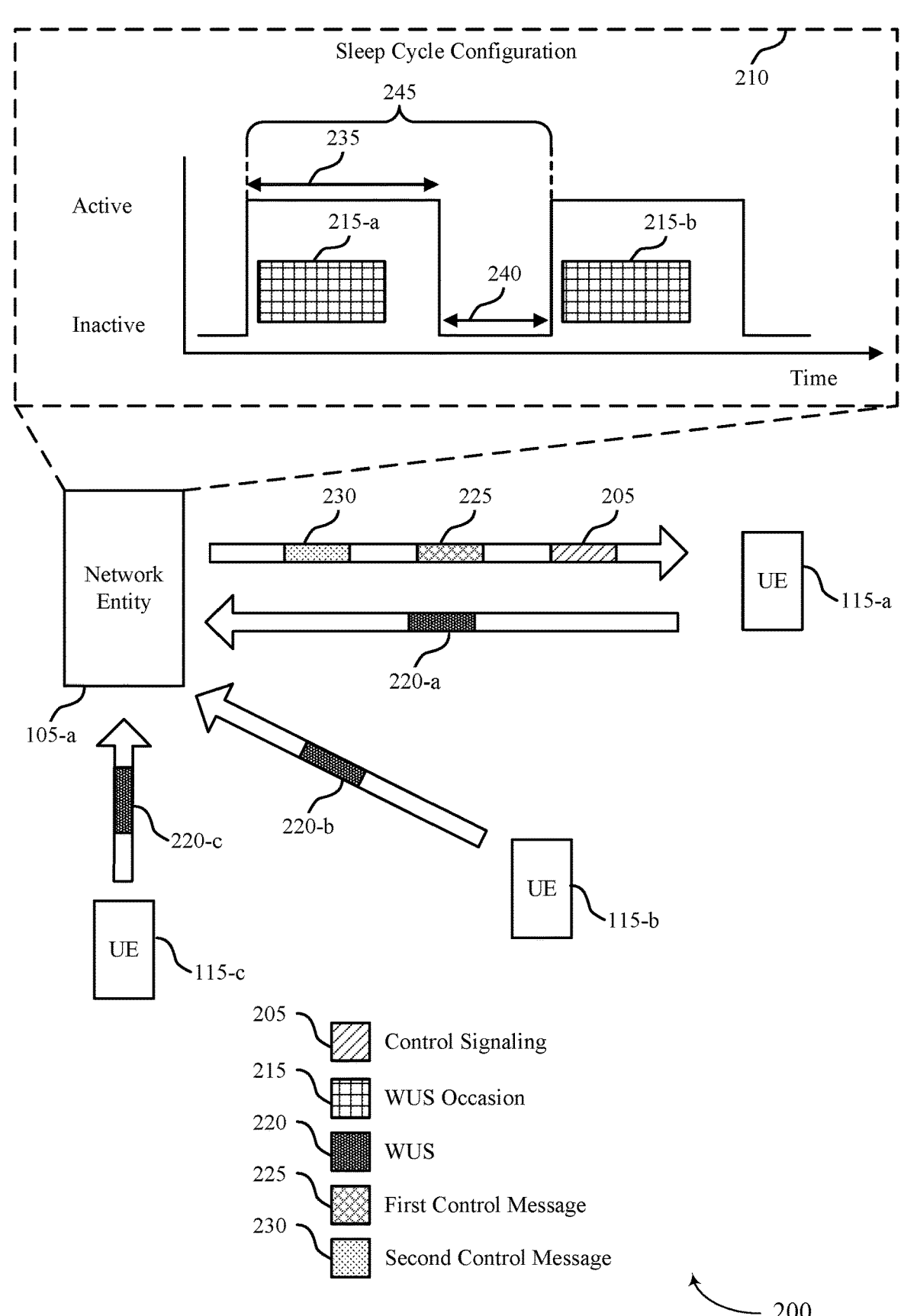

FIG. 2 illustrates an example of a wireless communications system 200 that supports dynamic adaptation of a sleep cycle for a cell in accordance with one or more aspects of the present disclosure. For example, wireless communications system 200 may support dynamic sleep cycle communications, WUS communications, or both between wireless devices such as a UE 115-a, a UE 115-b, a UE 115-c, and a network entity 105-a, which may be examples of UEs 115 and a network entity 105 as described with reference to FIG. 1.

In some examples, the network entity 105-a may operate in accordance with various modes and operations to save power and maintain network operation. For example, the network entity 105-a may transition into different sleep modes based on a level of traffic. For instance, the network entity 105-a may operate in accordance with an active mode, a light sleep mode, a deep sleep mode, or a combination thereof. As such, sleep modes may be different in terms of operation. For example, sleep modes such as deep sleep may turn off radio frequency chains (e.g., stop powering antennas of the network entity 105-a associated with the radio frequency chains) and some sleep modes such as light sleep may refrain from turning off the radio frequency chains. Additionally, or alternatively, sleep modes may be associated with a different level of power consumption at the network entity 105-a and a different duration of time to transition to the sleep mode. For example, the light sleep mode may have a higher level of power consumption and a shorter duration of time to transition relative to the deep sleep mode.

In some cases, during various durations of the day (e.g., off-peak times), the level of traffic at the network entity 105-a may be below a configured threshold. In such cases, the network entity 105-a may operate in accordance with a sleep mode to decrease power consumption at the network entity 105-a. However, during operations of the day where traffic is below the configured threshold, the network entity 105-a may still periodically transmit broadcast signals (e.g., an SSB or SI) to the one or more associated UEs 115. Additionally, or alternatively, the network entity 105-a may periodically monitor PRACH occasions for possible RACH or SDTs from the one or more UEs 115. During such examples of periodic transmissions and periodic monitoring, the network entity 105-a may operate in the active operation, which may increase power consumption at the network entity 105-a. If the network entity 105-a identifies no connected UEs 115 or a level of traffic below the configured threshold, the network entity 105-a may stop or decrease periodic transmission and periodic monitoring in accordance with network power savings.

As such, the network entity 105-a may use one or more techniques to identify whether one or more UEs 115 are requesting to transition into a connected state or requesting to perform SDT. For instance, the network entity 105-a may transmit control signaling 205 that indicates a sleep cycle configuration 210 of a network entity 105-a over which the network entity 105-a alternates between an active time duration 235 and an inactive time duration 240. As illustrated in FIG. 2, the sleep cycle configuration 210 may include respective WUS occasions 215 (e.g., WUS occasion 215-a and 215-b) within respective active time durations 235 of the sleep cycle configuration 210. As illustrated one active time duration 235 and one inactive time duration 240 may be included in one sleep cycle 245 of the sleep cycle configuration 210. In some examples, the WUS occasions may be associated with a set of time and frequency resources that the UEs 115 may use to transmit respective WUSs 220. For example, one or more of the UEs 115 may transmit a respective WUS 220 (e.g., WUS 220-a, 220-b, and 220-c) during the WUS occasion 215-a to indicate for the network entity 105-a to transition to the active state. As such, during a given WUS occasion 215, the network entity 105-a may monitor for WUSs 220 from the UEs 115. While FIG. 2 illustrates the network entity 105-a transmitting the control signaling 205 to the UE 115-a, it is understood that the network entity 105-a may transmit the control signaling 205 to any of the UEs 115 via unicast or multicast (e.g., broadcast or groupcast) techniques.

In some cases, the network entity 105-a may increase energy efficiency if the network entity 105-a wakes up to serve multiple UEs 115 at once. For example, a given WUS 220 may indicate one or more parameters for the associated UE 115, such as a buffer status report (BSR), one or more UE 115 power parameters, among other parameters. As such, the network entity 105-a may use the one or more parameters from each received WUS 220 to determine whether to transition to the active state or extend the inactive time duration 240.

According to the techniques described herein, the network entity 105-a may dynamically adapt sleep cycle configuration 210 based on the one or more parameters received in the respective WUSs 220. For example, during a time and frequency resource after the WUS occasion 215-a and during the first active time duration 235, the UEs may monitor for a first control message 225 indicating a power state of the network entity 105-a. As such, during the same time and frequency resource, each UE 115 may receive the first control message 225 which may include an indication of a dynamic adaptation to the sleep cycle configuration 210 and indicate the power state of the network entity 105-a.

In some examples, the first control message 225 that is sent to all of the UEs 115, may include a time offset indication that indicates a time shift to one or more active time durations 235 of the sleep cycle configuration 210.

Figure 3:
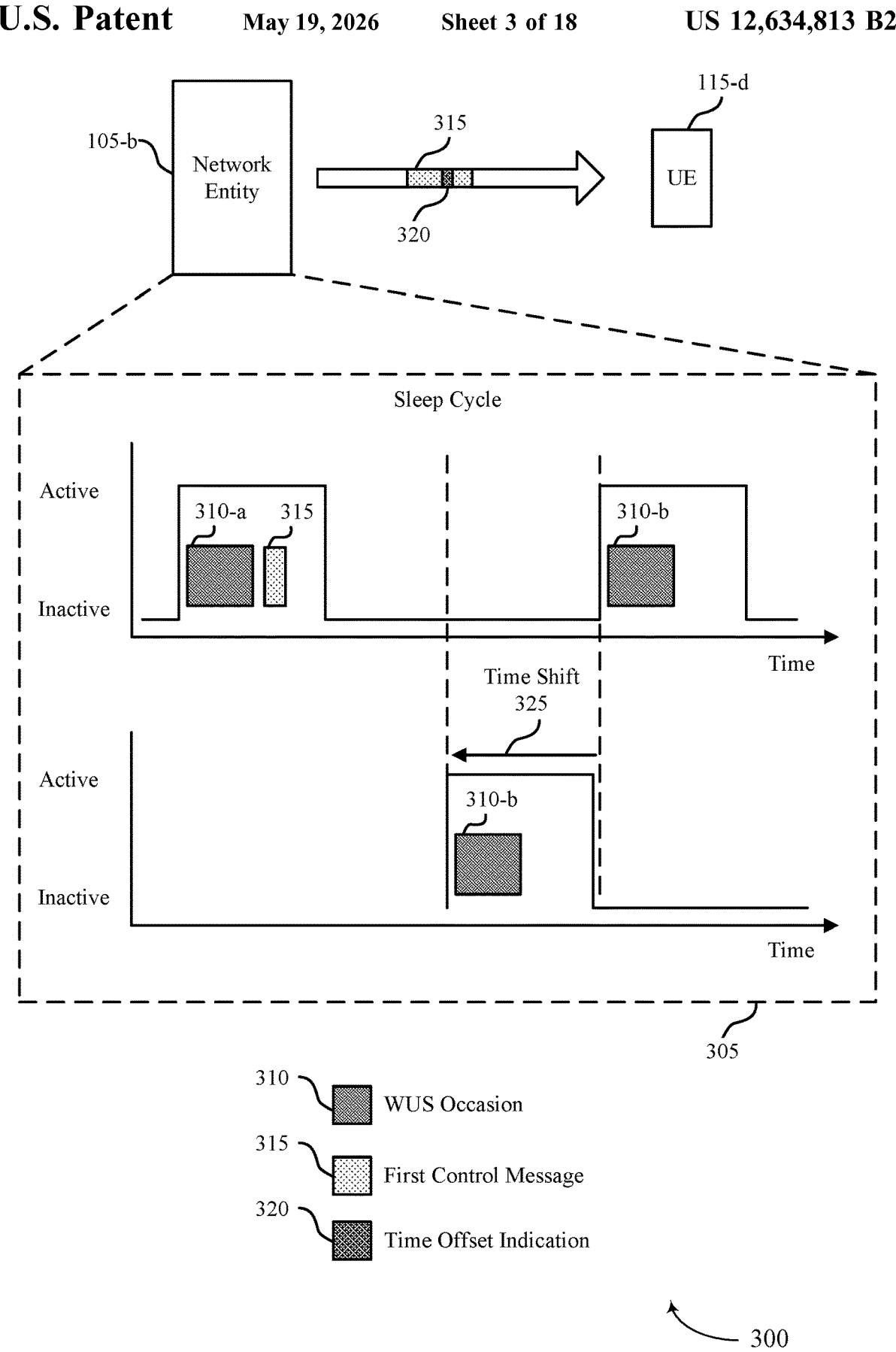

Further discussion of the time offset indication is described herein, including with reference to FIG. 3. Additionally, or alternatively, the first control message 225 may include a time duration increase indication that indicates an increased time duration of one or more upcoming instances of active time durations 235 of the sleep cycle configuration 210. Further discussion of the time duration increase indication is described herein, including with reference to FIG. 4.

In some examples, the network entity 105-*a* may transmit to the UEs 115, the first control message 225 in the payload of a PDSCH.

In some examples, the network entity 105-*a* may transmit the first control message 225 in a DCI format. For example, the first control message 225 may include one or more DCI bit values, where a given DCI bit value may indicate a respective type of the dynamic adaptation of the sleep cycle configuration 210. Additionally, or alternatively, the network entity 105-*a* may transmit a second control message 230 which may indicate a table that associates respective DCI bit values to a respective type of dynamic adaptation of the sleep cycle configuration 210. In some cases, the second control message 230 may be an example of an RRC message. An example of the table included in the second control message 230 is described, with reference to Table 1:

TABLE 1

| DCI Indication | Dynamic Adaptation to Sleep cycle |
|---|---|
| 00 | Network entity transitions to active mode |
| 01 | Apply a time offset to one or more cycles |
| 11 | Extend active time duration of one or more cycles |

In some examples, the first control message 225 may indicate one or more or the DCI indications in combination. As such, the first control message 225 may indicate for the UEs 115 to apply multiple types of dynamic adaptation to the cycle configuration 210. In some examples, the quantity of cycles of the sleep cycle configuration 210 impacted by the first control message 225 may be indicated in the first control message 225. Additionally, or alternatively, the quantity of cycles impacted may be indicated via signaling different than the first control message 225 (e.g., an RRC message, a medium access control-control element (MAC-CE) message, or a DCI message). By operating in accordance with a dynamic adaptation of the sleep cycle configuration 210, the network entity 105-*a* may decrease a duration of time for operating in the active mode, which may decrease power consumption at the network entity 105-*a*. Additionally, or alternatively, the dynamic adaptation of the sleep cycle configuration 210 may decrease the quantity of WUS occasions 215, which may decrease the amount of UE traffic and decrease power consumption at the UEs 115.

FIG. 3 illustrates an example of a wireless communications system 300 that supports dynamic adaptation of a sleep cycle for a cell in accordance with one or more aspects of the present disclosure. In some instances, wireless communications system 300 may implement one or more aspects of wireless communications systems 100 and 200. For instance, UE 115-*d* and network entity 105-*b* may be respective examples of a UE 115 and a network entity 105 with reference to FIGS. 1 and 2. Additionally, or alternatively, sleep cycle 305 may be an example of a sleep cycle configuration 210, WUS occasions 310 may be examples of WUS occasions 215, and a first control message 315 may be an example of first control message 225, with reference to FIG. 2. In some examples, wireless communications system 300 may include the network entity 105-*b* indicating to the UE 115-*d*, a dynamic adaptation of the sleep cycle 305, where the dynamic adaption includes a time offset indication 320. While wireless communications system 300 illustrates communications between a single UE 115 and a single network entity 105, it is understood that the techniques described in FIG. 3 may be implemented for any quantity of network devices. For example, the network entity 105-*b* may transmit the first control message 315 to one or more UEs 115 via unicast or broadcast transmissions.

As illustrated in FIG. 3, the network entity 105-*b* may operate in accordance with the sleep cycle 305, over which the network entity 105-*b* alternates between an active time duration and an inactive time duration. In some examples, a given active time duration of the sleep cycle 305 may include a respective WUS occasion 310 (e.g., WUS occasion 310-*a* and 310-*b*), during which the network entity 105-*b* may monitor for a WUS from the UE 115-*d* or other UEs 115. In some examples, the UE 115-*d* may monitor for the first control message 315 from the network entity 105-*b*. As illustrated in FIG. 3, the UE 115-*d* may monitor and receive the first control message 315 via a time and frequency resource within the first active time duration of the sleep cycle 305 that occurs after the WUS occasion 310-*a*.

With reference to FIG. 3, the first control message 315 may include a time offset indication 320 that may indicate a time shift 325 of one or more active time durations of the sleep cycle 305. For example, as illustrated in FIG. 3, the time shift 325 may be negative, which may indicate that the second active time duration of the sleep cycle 305 may occur earlier in time by a duration equal to the time shift 325. Additionally, or alternatively, the time shift 325 may be positive, which may indicate that the second active time duration of the sleep cycle 305 may occur time in time by a duration equal to the time shift 325.

Based on receiving the first control message 315, the UE 115-*d* may update the sleep cycle 305 schedule of the network entity 105-*b* at the UE 115-*d*. As such, the UE 115-*d* may communicate with network entity 105-*b* during the WUS occasion 310-*b* in accordance with the time shift 325 update. In some examples, the first control message 315 may indicate the quantity of cycles of the sleep cycle 305 for the UE 115-*d* to apply the time shift 325 to. Additionally, or alternatively, the network entity 105-*b* may indicate the quantity of cycles for the UE 115-*d* to apply the time shift 325 to via signaling different than the first control message 315 (e.g., an RRC message, a MAC-CE message, or a DCI message). In some examples, the network entity 105-*b* may indicate for the UE 115-*d* to apply the time shift 325 to the following active time duration, to a quantity of upcoming active time durations, or the total sequence of active time durations included in the sleep cycle 305.

Figure 4:
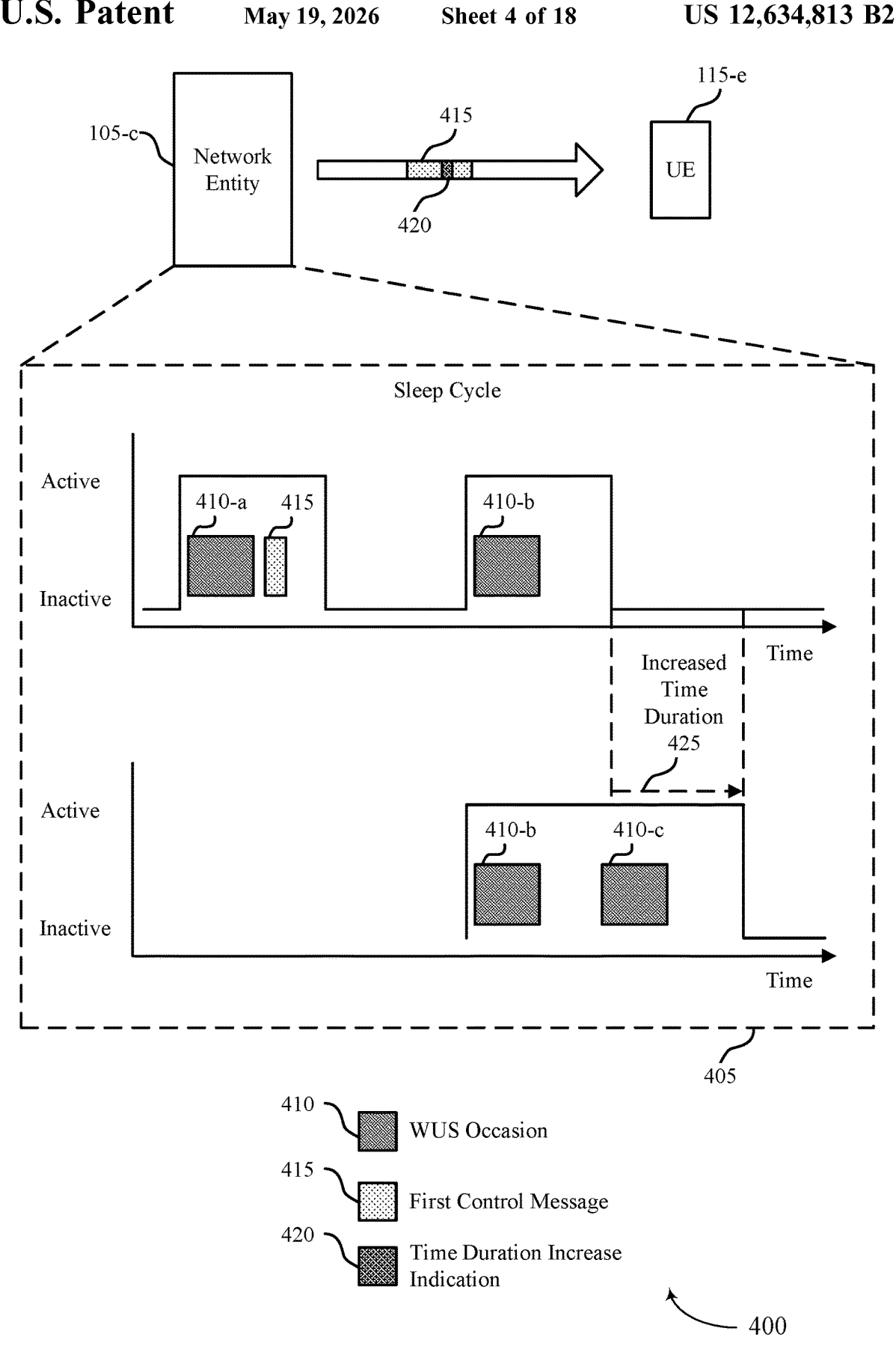

FIG. 4 illustrates an example of a wireless communications system 400 that supports dynamic adaptation of a sleep cycle for a cell in accordance with one or more aspects of the present disclosure. In some instances, wireless communications system 400 may implement one or more aspects of wireless communications systems 100 and 200. For instance, UE 115-*e* and network entity 105-*c* may be respective examples of a UE 115 and a network entity 105 with reference to FIGS. 1 and 2. Additionally, or alternatively, sleep cycle 405 may be an example of a sleep cycle configuration 210, WUS occasions 410 may be examples of WUS occasions 215, and a first control message 415 may be an example of first control message 225, with reference to FIG. 2. In some examples, wireless communications system 400 may include the network entity 105-*c* indicating to the UE 115-*e*, a dynamic adaptation of the sleep cycle 405, where the dynamic adaption includes a time duration increase indication 420. While wireless communications system 400 illustrates communications between a single UE 115 and a single network entity 105, it is understood that the techniques described in FIG. 4 may be implemented for any quantity of network devices. For example, the network entity 105-*c* may transmit the first control message 415 to one or more UEs 115 via unicast or broadcast transmissions.

As illustrated in FIG. 4, the network entity 105-*c* may operate in accordance with the sleep cycle 405, over which the network entity 105-*c* alternates between an active time duration and an inactive time duration. In some examples, a given active time duration of the sleep cycle 405 may include a respective WUS occasion 410 (e.g., WUS occasion 410-*a* and 410-*b*), during which the network entity 105-*c* may monitor for a WUS from the UE 115-*e* or other UEs 115. In some examples, the UE 115-*e* may monitor for the first control message 415 from the network entity 105-*c*. As illustrated in FIG. 4, the UE 115-*e* may monitor and receive the first control message 415 via a time and frequency resource within the first active time duration of the sleep cycle 405 that occurs after the WUS occasion 410-*a*.

With reference to FIG. 4, the first control message 415 may include a time duration increase indication 420 that may indicate an increase time duration 425 of one or more active time durations of the sleep cycle 405. For example, as illustrated in FIG. 4, the second active time duration may be increased by a duration of time equal to the increased time duration 425. Additionally, or alternatively, the time duration increase indication 420 may indicate that the second active time duration may include additional WUS occasions 410. For example, the time duration increase indication 420 may indicate that the second active time duration may include the WUS occasion 410-*b* and a WUS occasion 410-*c*.

Based on receiving the first control message 415, the UE 115-*e* may update the sleep cycle 405 schedule of the network entity 105-*c* at the UE 115-*e*. As such, the UE 115-*e* may communicate with network entity 105-*c* during the WUS occasion 410-*b*, the WUS occasion 410-*b*, or a combination thereof. In some examples, the first control message 415 may indicate the quantity of cycles of the sleep cycle 405 for the UE 115-*e* to apply the increased time duration 425 to. Additionally, or alternatively, the network entity 105-*c* may indicate the quantity of cycles for the UE 115-*e* to apply the increased time duration 425 to via signaling different than the first control message 415 (e.g., an RRC message, a MAC-CE message, or a DCI message). In some examples, the network entity 105-*c* may indicate for the UE 115-*e* to apply the increased time duration 425 to the following active time duration, to a quantity of upcoming active time durations, or the total sequence of active time durations included in the sleep cycle 405.

Figure 5:
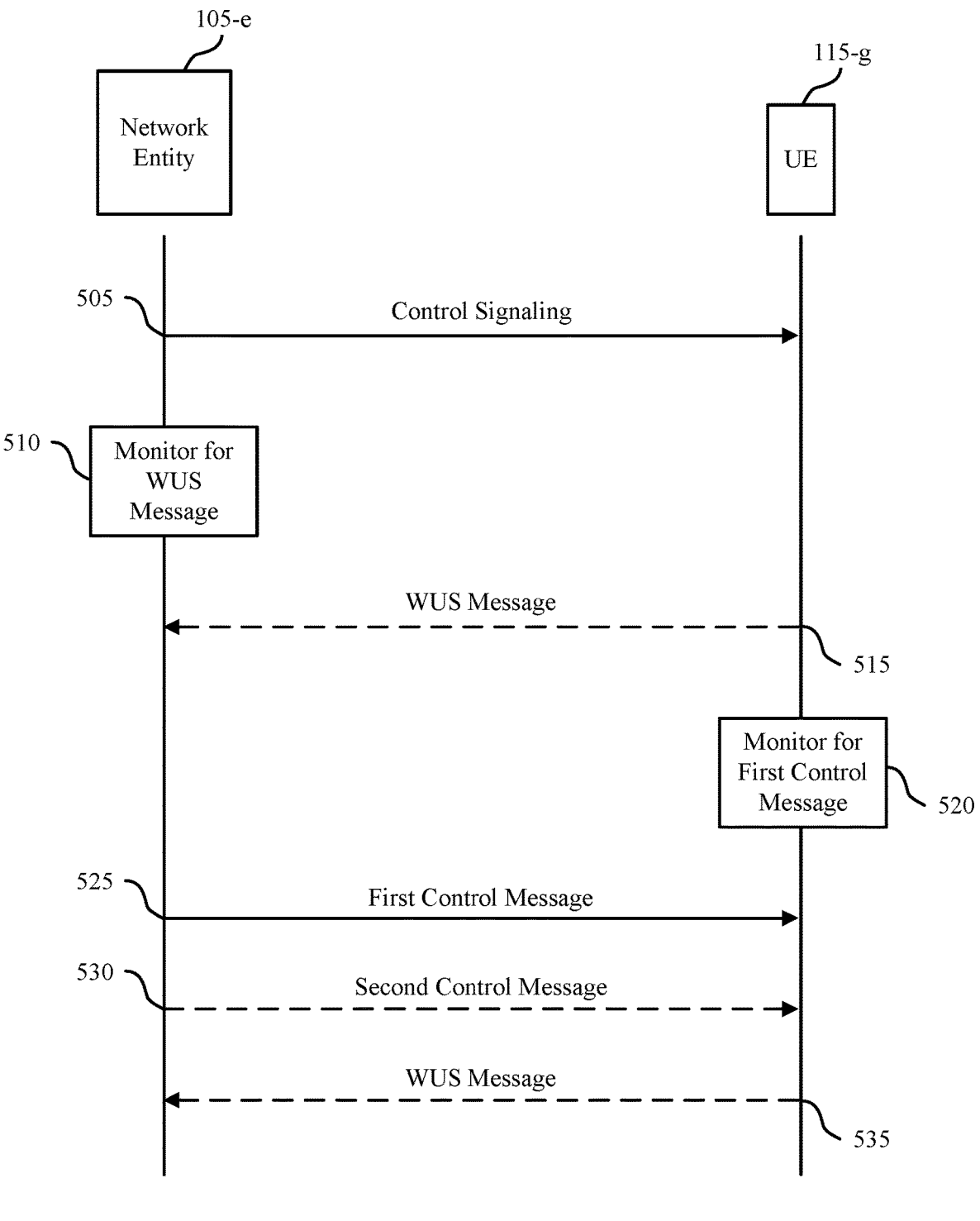
FIG. 5 illustrates an example of a process flow that supports dynamic adaptation of a sleep cycle for a cell in accordance with one or more aspects of the present disclosure.

FIG. 5 illustrates an example of a process flow 500 that supports dynamic adaptation of a sleep cycle for a cell in accordance with one or more aspects of the present disclosure. In some examples, process flow 500 may implement aspects of wireless communications system 100 through 500. Process flow 500 includes a UE 115-*g* and a network entity 105-*e* which may be respective examples of a UE 115 and a network entity 105, as described with reference to FIGS. 1 through 5. Alternative examples of the following may be implemented, where some steps are performed in a different order than described or are not performed at all. In some cases, steps may include additional features not mentioned below, or further steps may be added. In addition, while process flow 500 shows processes between a single UE 115 and a single network entity 105, it should be understood that these processes may occur between any number of network devices and network device types.

At 505, the UE 115-*g* may receive control signaling that indicates a sleep cycle of the network entity 105-*e* over which the network entity 105-*e* alternates between an active time duration and an inactive time duration. Additionally, or alternatively, the control signaling may include a WUS occasion within a first active time duration of the sleep cycle for communication of a WUS, and a time and frequency resource within the first active time duration of the sleep cycle that occurs after the WUS occasion. In some examples, the network entity 105-*e* may be associated with a set of UEs 115, and as such, may transmit the control signaling to each UE 115 of the set of UEs 115.

At 510, the network entity 105-*e* may monitor the WUS occasion, for a WUS from the UE 115-*g*. In some examples, the network entity 105-*e* may be associated with a set of UEs 115, and as such, may monitor for a WUS from the set of UEs 115.

At 515, the UE 115-*g* may transmit to the network entity 105-*e* during the WUS occasion, a first WUS during the first active time duration. In some examples, the UE 115-*g* may refrain from transmitting the first WUS during the first active time duration.

At 520, the UE 115-*g* may monitor, via the time and frequency resource, for a first control message indicating a power state of the network entity 105-*e*.

At 525, the UE 115-*g* may receive, via the time and frequency resource, the first control message including an indication of a dynamic adaptation to the sleep cycle and indicating the power state of the network entity 105-*e*. In some examples, the UE 115-*g* may receive the first control message including the indication of the dynamic adaptation to the sleep cycle is based on transmitting the first WUS, at 515. In some examples, the UE 115-*g* may receive the first control message without transmitting the first WUS, at 515. In some examples, the network entity 105-*e* may be associated with a set of UEs 115, and as such, may transmit the first control message to each UE 115 of the set of UEs 115.

In some examples, receiving the dynamic adaptation to the sleep cycle may include receiving a time offset indication that indicates a time shift to the active time duration of the sleep cycle. Additionally, or alternatively, receiving the dynamic adaptation to the sleep cycle may include receiving a time duration increase indication that indicates an increased time duration of an upcoming instance of the active time duration of the sleep cycle. In some examples, the dynamic adaptation may indicate a quantity of instances of the active time duration of the sleep cycle that the dynamic adaptation may be applied to.

In some examples, the UE 115-*g* may receive the first control message as part of a payload of a PDSCH.

In some examples, the first control message may be an example of a DCI message. In such examples, the first control message may include DCI including one or more bit values that indicates a type of the dynamic adaptation of the sleep cycle. In some examples, the DCI may indicate multiple types of dynamic adaptations of the sleep cycle, where each of the multiple types of dynamic adaptations may be applied to the sleep cycle.

In cases where the first control message is an example of a DCI message, at 530, the UE 115-*g* may receive a second control message including an indication of a table that associates respective bit values to a respective type of dynamic adaptation of the sleep cycle of a quantity of dynamic sleep cycle adaptation types. In some examples, the network entity 105-e may be associated with a set of UEs 115, and as such, may transmit the second control message to each UE 115 of the set of UEs 115.

At 535, the UE 115-g may transmit to the network entity 105-e, a WUS during a second upcoming instance of the active time duration of the sleep cycle in accordance with the indication of the dynamic adaptation to the sleep cycle.

Figure 6:
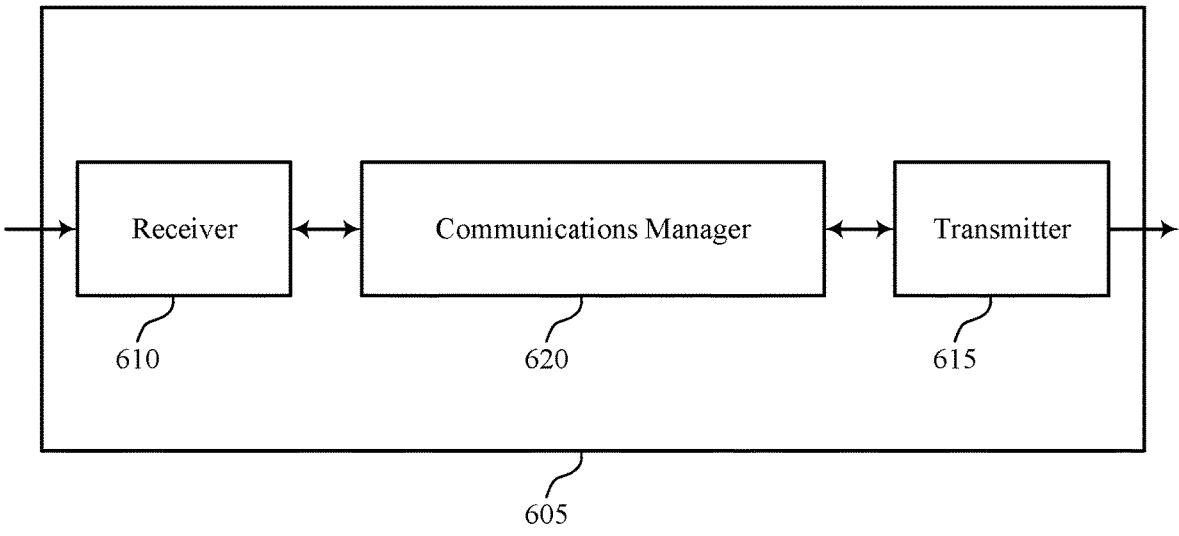
FIGS. 6 and 7 illustrate block diagrams of devices that support dynamic adaptation of a sleep cycle for a cell in accordance with one or more aspects of the present disclosure.

FIG. 6 illustrates a block diagram 600 of a device 605 that supports dynamic adaptation of a sleep cycle for a cell in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to dynamic adaptation of a sleep cycle for a cell). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to dynamic adaptation of a sleep cycle for a cell). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of dynamic adaptation of a sleep cycle for a cell as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a UE in accordance with examples as disclosed herein. For example, the communications manager 620 may be configured as or otherwise support a means for receiving control signaling that indicates a sleep cycle of a network entity over which the network entity alternates between an active time duration and an inactive time duration, a WUS occasion within a first active time duration of the sleep cycle for communication of a WUS, and a time and frequency resource within the first active time duration of the sleep cycle that occurs after the WUS occasion. The communications manager 620 may be configured as or otherwise support a means for receiving, via the time and frequency resource, a first control message including an indication of a dynamic adaptation to the sleep cycle and indicating the power state of the network entity.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for dynamic adaptation of a sleep cycle for a network entity which may support reduced processing, reduced power consumption, more efficient utilization of communication resources.

Figure 7:
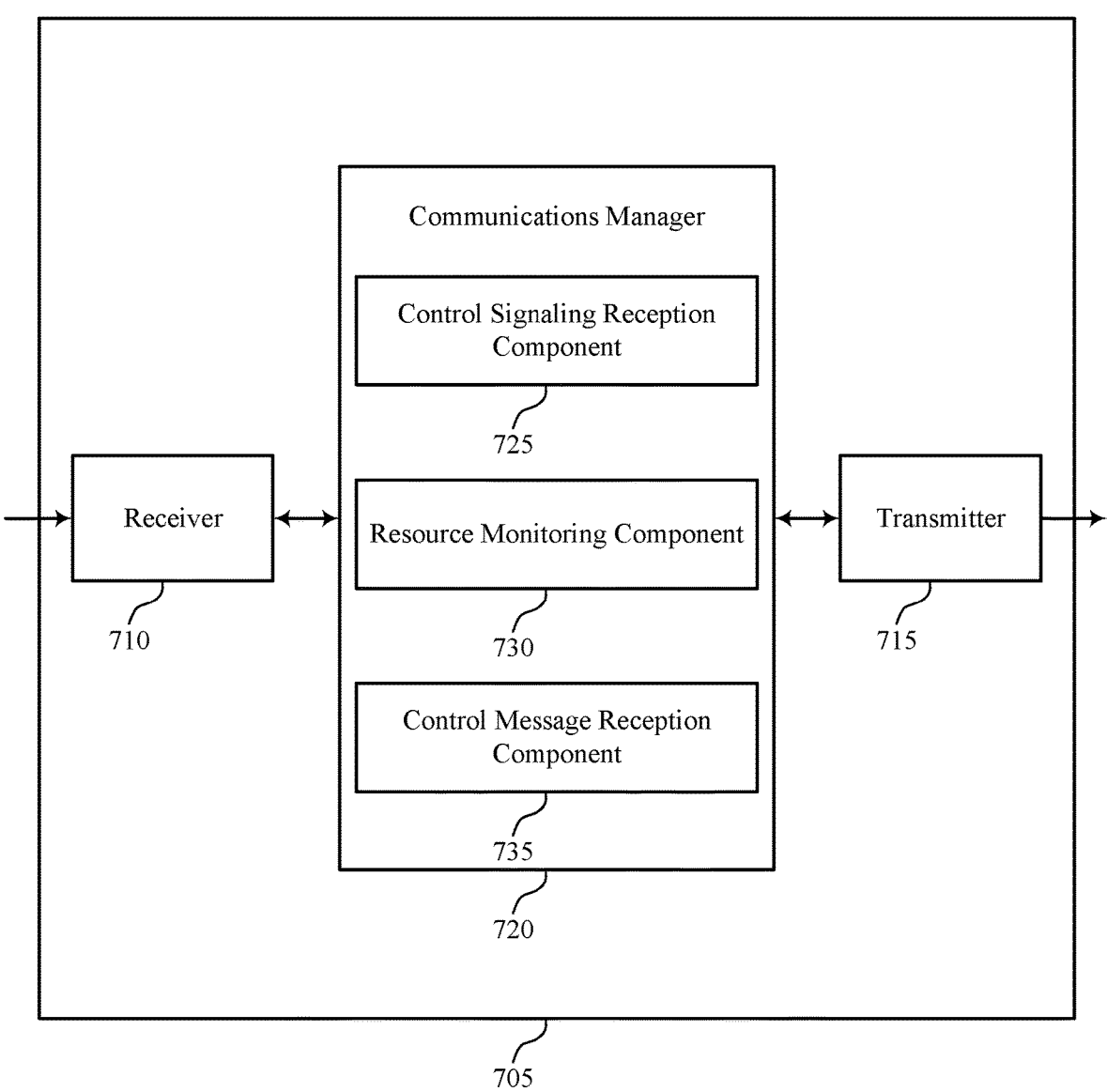

FIG. 7 illustrates a block diagram 700 of a device 705 that supports dynamic adaptation of a sleep cycle for a cell in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to dynamic adaptation of a sleep cycle for a cell). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to dynamic adaptation of a sleep cycle for a cell). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of dynamic adaptation of a sleep cycle for a cell as described herein. For example, the communications manager 720 may include a control signaling reception component 725, a resource monitoring component 730, a control message reception component 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a UE in accordance with examples as disclosed herein. The control signaling reception component 725 may be configured as or otherwise support a means for receiving control signaling that indicates a sleep cycle of a network entity over which the network entity alternates between an active time duration and an inactive time duration, a WUS occasion within a first active time duration of the sleep cycle for communication of a WUS, and a time and frequency resource within the first active time duration of the sleep cycle that occurs after the WUS occasion. The resource monitoring component 730 may be configured as or otherwise support a means for monitoring, via the time and frequency resource, for a first control message indicating a power state of the network entity. The control message reception component 735 may be configured as or otherwise support a means for receiving, via the time and frequency resource, the first control message including an indication of a dynamic adaptation to the sleep cycle and indicating the power state of the network entity.

FIG. 8 illustrates a block diagram 800 of a communications manager 820 that supports dynamic adaptation of a sleep cycle for a cell in accordance with one or more aspects of the present disclosure. The communications manager 820 may be an example of aspects of a communications manager 620, a communications manager 720, or both, as described herein. The communications manager 820, or various components thereof, may be an example of means for performing various aspects of dynamic adaptation of a sleep cycle for a cell as described herein. For example, the communications manager 820 may include a control signaling reception component 825, a resource monitoring component 830, a control message reception component 835, a WUS transmission component 840, or any combination thereof. Each of these components may communicate, directly or indirectly, with one another (e.g., via one or more buses).

The communications manager 820 may support wireless communications at a UE in accordance with examples as disclosed herein. The control signaling reception component 825 may be configured as or otherwise support a means for receiving control signaling that indicates a sleep cycle of a network entity over which the network entity alternates between an active time duration and an inactive time duration, a WUS occasion within a first active time duration of the sleep cycle for communication of a WUS, and a time and frequency resource within the first active time duration of the sleep cycle that occurs after the WUS occasion. The resource monitoring component 830 may be configured as or otherwise support a means for monitoring, via the time and frequency resource, for a first control message indicating a power state of the network entity. The control message reception component 835 may be configured as or otherwise support a means for receiving, via the time and frequency resource, the first control message including an indication of a dynamic adaptation to the sleep cycle and indicating the power state of the network entity.

In some examples, the WUS transmission component 840 may be configured as or otherwise support a means for transmitting, to the network entity during the WUS occasion, a first WUS during the first active time duration, the receiving of the first control message including the indication of the dynamic adaptation to the sleep cycle is based on transmitting the first WUS.

In some examples, the control message reception component 835 may be configured as or otherwise support a means for receiving, via the time and frequency resource, a time offset indication that indicates a time shift to the active time duration of the sleep cycle.

In some examples, the control message reception component 835 may be configured as or otherwise support a means for receiving, via the time and frequency resource, a time duration increase indication that indicates an increased time duration of an upcoming instance of the active time duration of the sleep cycle.

In some examples, the control message reception component 835 may be configured as or otherwise support a means for receiving the dynamic adaptation that indicates a quantity of instances of the active time duration of the sleep cycle.

In some examples, the control message reception component 835 may be configured as or otherwise support a means for receiving, the first control message including the indication of the dynamic adaptation to the sleep cycle, the downlink control information including one or more bit values that indicates a type of the dynamic adaptation of the sleep cycle.

In some examples, the control message reception component 835 may be configured as or otherwise support a means for receiving, a second control message including an indication of a table that associates respective bit values to a respective type of dynamic adaptation of the sleep cycle of a set of multiple dynamic sleep cycle adaptation types.

In some examples, the control message reception component 835 may be configured as or otherwise support a means for receiving the first control message via a PDSCH.

Figure 9:
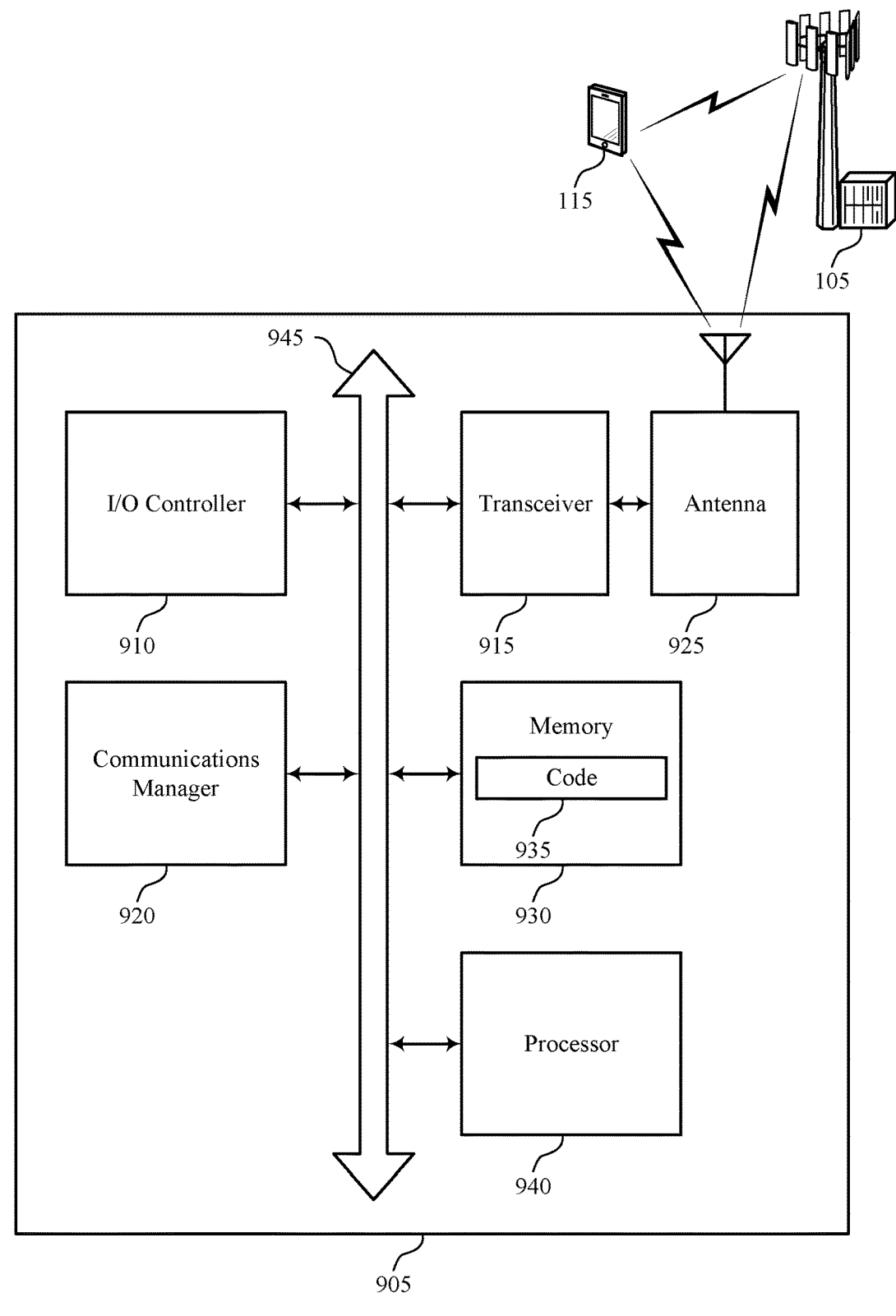
FIG. 9 illustrates a diagram of a system including a device that supports dynamic adaptation of a sleep cycle for a cell in accordance with one or more aspects of the present disclosure.

FIG. 9 illustrates a diagram of a system 900 including a device 905 that supports dynamic adaptation of a sleep cycle for a cell in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting dynamic adaptation of a sleep cycle for a cell). For example, the device 905 or a component of the device 905 may include a processor 940 and memory 930 coupled with or to the processor 940, the processor 940 and memory 930 configured to perform various functions described herein.

The communications manager 920 may support wireless communications at a UE in accordance with examples as disclosed herein. For example, the communications manager 920 may be configured as or otherwise support a means for receiving control signaling that indicates a sleep cycle of a network entity over which the network entity alternates between an active time duration and an inactive time duration, a WUS occasion within a first active time duration of the sleep cycle for communication of a WUS, and a time and frequency resource within the first active time duration of the sleep cycle that occurs after the WUS occasion. The communications manager 920 may be configured as or otherwise support a means for monitoring, via the time and frequency resource, for a first control message indicating a power state of the network entity. The communications manager 920 may be configured as or otherwise support a means for receiving, via the time and frequency resource, the first control message including an indication of a dynamic adaptation to the sleep cycle and indicating the power state of the network entity.

By including or configuring the communications manager 920 in accordance with examples as described herein, the device 905 may support techniques for dynamic adaptation of a sleep cycle for a network entity which may support improved communication reliability, reduced latency, improved user experience related to reduced processing, reduced power consumption, more efficient utilization of communication resources, improved coordination between devices, longer battery life, and improved utilization of processing capability.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of dynamic adaptation of a sleep cycle for a cell as described herein, or the processor 940 and the memory 930 may be otherwise configured to perform or support such operations.

Figure 10:
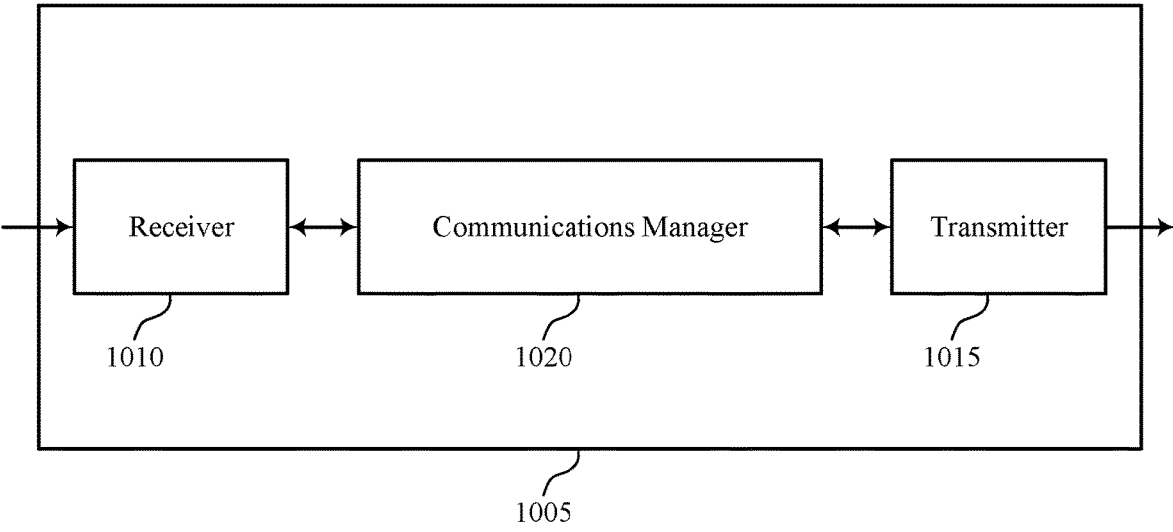
FIGS. 10 and 11 illustrate block diagrams of devices that support dynamic adaptation of a sleep cycle for a cell in accordance with one or more aspects of the present disclosure.

FIG. 10 illustrates a block diagram 1000 of a device 1005 that supports dynamic adaptation of a sleep cycle for a cell in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of dynamic adaptation of a sleep cycle for a cell as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a network entity in accordance with examples as disclosed herein. For example, the communications manager 1020 may be configured as or otherwise support a means for transmitting control signaling that indicates a sleep cycle of the network entity over which the network entity alternates between an active time duration and an inactive time duration, a WUS occasion within a first active time duration of the sleep cycle for communication of a WUS, and a time and frequency resource within the first active time duration of the sleep cycle that occurs after a WUS occasion. The communications manager 1020 may be configured as or otherwise support a means for monitoring, via the WUS occasion, for a WUS from one or more UEs. The communications manager 1020 may be configured as or otherwise support a means for transmitting, via the time and frequency resource, a first control message including an indication of a dynamic adaptation to the sleep cycle and indicating a power state of the network entity.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for dynamic adaptation of a sleep cycle for a network entity which may support reduced processing, reduced power consumption, more efficient utilization of communication resources.

Figure 11:
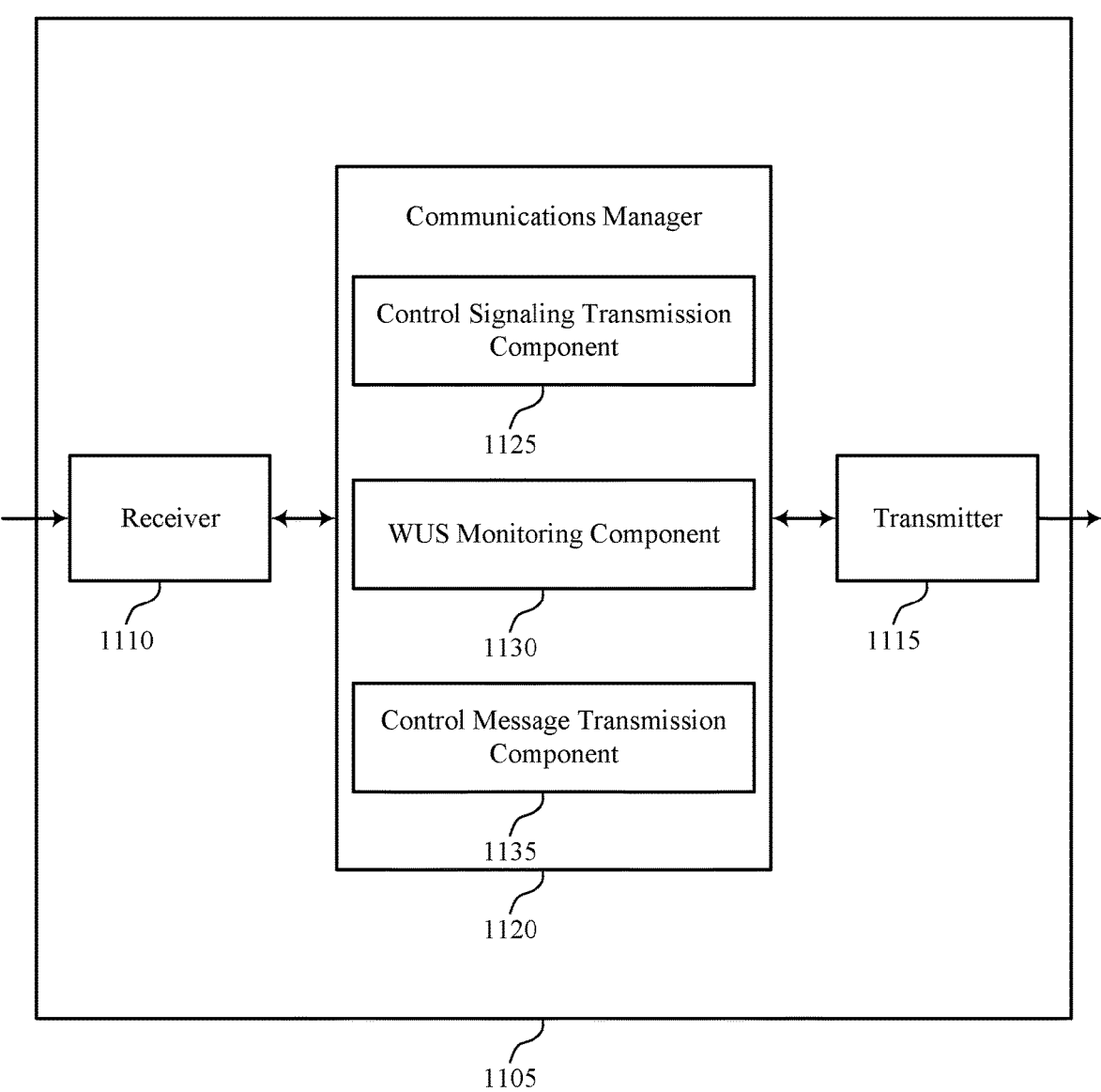

FIG. 11 illustrates a block diagram 1100 of a device 1105 that supports dynamic adaptation of a sleep cycle for a cell in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of dynamic adaptation of a sleep cycle for a cell as described herein. For example, the communications manager 1120 may include a control signaling transmission component 1125, a WUS monitoring component 1130, a control message transmission component 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a network entity in accordance with examples as disclosed herein. The control signaling transmission component 1125 may be configured as or otherwise support a means for transmitting control signaling that indicates a sleep cycle of the network entity over which the network entity alternates between an active time duration and an inactive time duration, a WUS occasion within a first active time duration of the sleep cycle for communication of a WUS, and a time and frequency resource within the first active time duration of the sleep cycle that occurs after a WUS occasion. The WUS monitoring component 1130 may be configured as or otherwise support a means for monitoring, via the WUS occasion, for a WUS from one or more UEs. The control message transmission component 1135 may be configured as or otherwise support a means for transmitting, via the time and frequency resource, a first control message including an indication of a dynamic adaptation to the sleep cycle and indicating a power state of the network entity.

Figure 12:
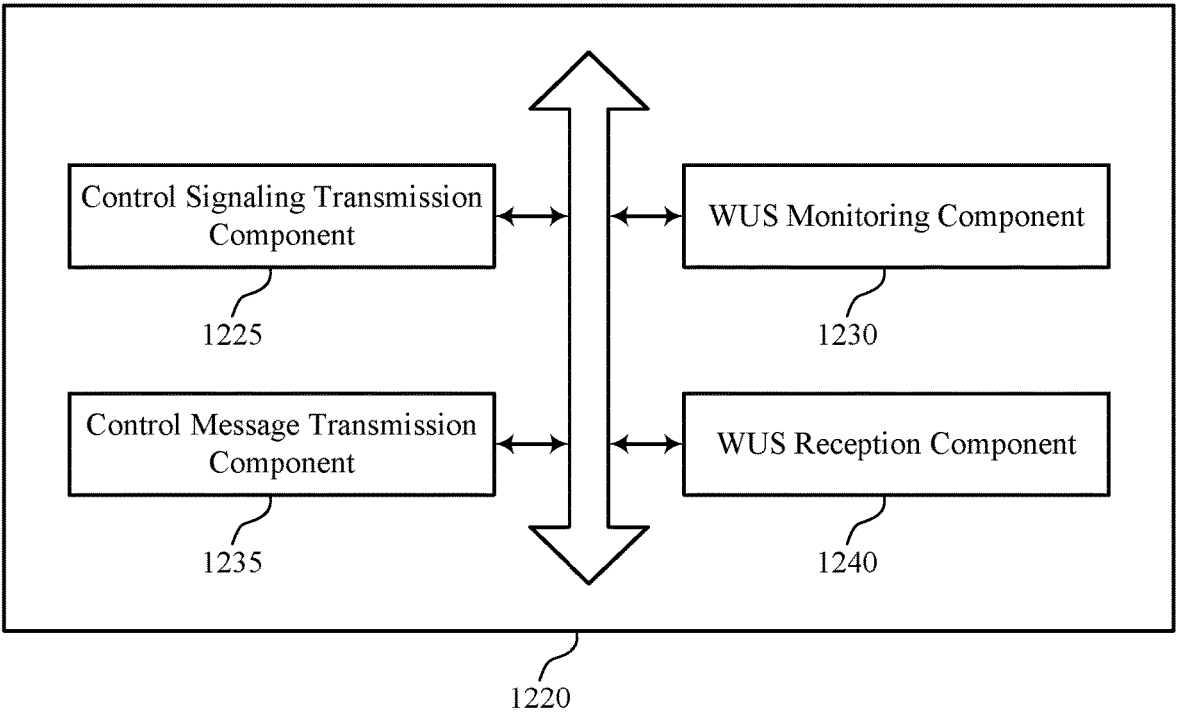
FIG. 12 illustrates a block diagram of a communications manager that supports dynamic adaptation of a sleep cycle for a cell in accordance with one or more aspects of the present disclosure.

FIG. 12 illustrates a block diagram 1200 of a communications manager 1220 that supports dynamic adaptation of a sleep cycle for a cell in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of dynamic adaptation of a sleep cycle for a cell as described herein. For example, the communications manager 1220 may include a control signaling transmission component 1225, a WUS monitoring component 1230, a control message transmission component 1235, a WUS reception component 1240, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communications at a network entity in accordance with examples as disclosed herein. The control signaling transmission component 1225 may be configured as or otherwise support a means for transmitting control signaling that indicates a sleep cycle of the network entity over which the network entity alternates between an active time duration and an inactive time duration, a WUS occasion within a first active time duration of the sleep cycle for communication of a WUS, and a time and frequency resource within the first active time duration of the sleep cycle that occurs after a WUS occasion. The WUS monitoring component 1230 may be configured as or otherwise support a means for monitoring, via the WUS occasion, for a WUS from one or more UEs. The control message transmission component 1235 may be configured as or otherwise support a means for transmitting, via the time and frequency resource, a first control message including an indication of a dynamic adaptation to the sleep cycle and indicating a power state of the network entity.

In some examples, the WUS reception component 1240 may be configured as or otherwise support a means for receiving, during the WUS occasion, at least one WUS from the one or more UEs of a set of multiple UEs during the first active time duration, the transmitting of the first control message including the indication of the dynamic adaptation to the sleep cycle being based on receiving the at least one WUS from the one or more UEs.

In some examples, the control message transmission component 1235 may be configured as or otherwise support a means for transmitting, via the time and frequency resource, a time offset indication that indicates a time shift to an upcoming instance of the active time duration of the sleep cycle.

In some examples, the control message transmission component 1235 may be configured as or otherwise support a means for transmitting, via the time and frequency resource, a time duration increase indication that indicates an increased time duration of an upcoming instance of the active time duration of the sleep cycle.

In some examples, the control message transmission component 1235 may be configured as or otherwise support a means for transmitting the dynamic adaptation that indicates a quantity of instances of the active time duration of the sleep cycle.

In some examples, the control message transmission component 1235 may be configured as or otherwise support a means for transmitting, the first control message including the indication of the dynamic adaptation to the sleep cycle, the downlink control information including one or more bit values that indicates a type of the dynamic adaptation of the sleep cycle.

In some examples, the control message transmission component 1235 may be configured as or otherwise support a means for transmitting, a second control message including an indication of a table that associates respective bit values to a respective type of dynamic adaptation of the sleep cycle of a set of multiple dynamic sleep cycle adaptation types.

In some examples, the control message transmission component 1235 may be configured as or otherwise support a means for transmitting the first control message via a PDSCH.

Figure 13:
FIG. 13 illustrates a diagram of a system including a device that supports dynamic adaptation of a sleep cycle for a cell in accordance with one or more aspects of the present disclosure.

FIG. 13 illustrates a diagram of a system 1300 including a device 1305 that supports dynamic adaptation of a sleep cycle for a cell in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting dynamic adaptation of a sleep cycle for a cell). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system. A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1305 may transmit information output from the chip or modem. Additionally, or alternatively, in some implementations, the one or more interfaces may refer to an interface between the processing system of the chip or modem and a receiver, such that the device 1305 may obtain information or signal inputs, and the information may be passed to the processing system. A person having ordinary skill in the art will readily recognize that a first interface also may obtain information or signal inputs, and a second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communications at a network entity in accordance with examples as disclosed herein. For example, the communications manager 1320 may be configured as or otherwise support a means for transmitting control signaling that indicates a sleep cycle of the network entity over which the network entity alternates between an active time duration and an inactive time duration, a WUS occasion within a first active time duration of the sleep cycle for communication of a WUS, and a time and frequency resource within the first active time duration of the sleep cycle that occurs after a WUS occasion. The communications manager 1320 may be configured as or otherwise support a means for monitoring, via the WUS occasion, for a WUS from one or more UEs. The communications manager 1320 may be configured as or otherwise support a means for transmitting, via the time and frequency resource, a first control message including an indication of a dynamic adaptation to the sleep cycle and indicating a power state of the network entity.

By including or configuring the communications manager 1320 in accordance with examples as described herein, the device 1305 may support techniques for dynamic adaptation of a sleep cycle for a network entity which may support improved communication reliability, reduced latency, improved user experience related to reduced processing, reduced power consumption, more efficient utilization of communication resources, improved coordination between devices, longer battery life, and improved utilization of processing capability.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, the processor 1335, the memory 1325, the code 1330, or any combination thereof. For example, the code 1330 may include instructions executable by the processor 1335 to cause the device 1305 to perform various aspects of dynamic adaptation of a sleep cycle for a cell as described herein, or the processor 1335 and the memory 1325 may be otherwise configured to perform or support such operations.

FIG. 14 illustrates a flowchart illustrating a method 1400 that supports dynamic adaptation of a sleep cycle for a cell in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving control signaling that indicates a sleep cycle of a network entity over which the network entity alternates between an active time duration and an inactive time duration, a WUS occasion within a first active time duration of the sleep cycle for communication of a WUS, and a time and frequency resource within the first active time duration of the sleep cycle that occurs after the WUS occasion. The operations of 1405 may be performed in accordance with examples as disclosed herein. In some examples, aspects of the operations of 1405 may be performed by a control signaling reception component 825 as described with reference to FIG. 8.

At 1410, the method may include receiving, via the time and frequency resource, a first control message including an indication of a dynamic adaptation to the sleep cycle and indicating a power state of the network entity. The operations of 1410 may be performed in accordance with examples as disclosed herein. In some examples, aspects of the operations of 1410 may be performed by a control message reception component 835 as described with reference to FIG. 8.

FIG. 15 illustrates a flowchart illustrating a method 1500 that supports dynamic adaptation of a sleep cycle for a cell in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving control signaling that indicates a sleep cycle of a network entity over which the network entity alternates between an active time duration and an inactive time duration, a WUS occasion within a first active time duration of the sleep cycle for communication of a WUS, and a time and frequency resource within the first active time duration of the sleep cycle that occurs after the WUS occasion. The operations of 1505 may be performed in accordance with examples as disclosed herein. In some examples, aspects of the operations of 1505 may be performed by a control signaling reception component 825 as described with reference to FIG. 8.

At 1510, the method may include transmitting, to the network entity during the WUS occasion, a first WUS during the first active time duration, the receiving of the first control message including the indication of the dynamic adaptation to the sleep cycle is based on transmitting the first WUS. The operations of 1510 may be performed in accordance with examples as disclosed herein. In some examples, aspects of the operations of 1510 may be performed by a WUS transmission component 840 as described with reference to FIG. 8.

At 1515, the method may include receiving, via the time and frequency resource, the first control message including an indication of a dynamic adaptation to the sleep cycle and indicating a power state of the network entity. The operations of 1515 may be performed in accordance with examples as disclosed herein. In some examples, aspects of the operations of 1515 may be performed by a control message reception component 835 as described with reference to FIG. 8.

FIG. 16 illustrates a flowchart illustrating a method 1600 that supports dynamic adaptation of a sleep cycle for a cell in accordance with one or more aspects of the present disclosure. The operations of the method 1600 may be implemented by a network entity or its components as described herein. For example, the operations of the method 1600 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1605, the method may include transmitting control signaling that indicates a sleep cycle of the network entity over which the network entity alternates between an active time duration and an inactive time duration, a WUS occasion within a first active time duration of the sleep cycle for communication of a WUS, and a time and frequency resource within the first active time duration of the sleep cycle that occurs after a WUS occasion. The operations of 1605 may be performed in accordance with examples as disclosed herein. In some examples, aspects of the operations of 1605 may be performed by a control signaling transmission component 1225 as described with reference to FIG. 12.

At 1610, the method may include transmitting, via the time and frequency resource, a first control message including an indication of a dynamic adaptation to the sleep cycle and indicating a power state of the network entity. The operations of 1610 may be performed in accordance with examples as disclosed herein. In some examples, aspects of the operations of 1610 may be performed by a control message transmission component 1235 as described with reference to FIG. 12.

FIG. 17 illustrates a flowchart illustrating a method 1700 that supports dynamic adaptation of a sleep cycle for a cell in accordance with one or more aspects of the present disclosure. The operations of the method 1700 may be implemented by a network entity or its components as described herein. For example, the operations of the method 1700 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1705, the method may include transmitting control signaling that indicates a sleep cycle of the network entity over which the network entity alternates between an active time duration and an inactive time duration, a WUS occasion within a first active time duration of the sleep cycle for communication of a WUS, and a time and frequency resource within the first active time duration of the sleep cycle that occurs after a WUS occasion. The operations of 1705 may be performed in accordance with examples as disclosed herein. In some examples, aspects of the operations of 1705 may be performed by a control signaling transmission component 1225 as described with reference to FIG. 12.

At 1710, the method may include receiving, during the WUS occasion, at least one WUS from the one or more UEs of a set of multiple UEs during the first active time duration, the transmitting of the first control message including the indication of the dynamic adaptation to the sleep cycle being based on receiving the at least one WUS from the one or more UEs. The operations of 1710 may be performed in accordance with examples as disclosed herein. In some examples, aspects of the operations of 1710 may be performed by a WUS reception component 1240 as described with reference to FIG. 12.

At 1715, the method may include transmitting, via the time and frequency resource, a first control message including an indication of a dynamic adaptation to the sleep cycle and indicating a power state of the network entity. The operations of 1715 may be performed in accordance with examples as disclosed herein. In some examples, aspects of the operations of 1715 may be performed by a control message transmission component 1235 as described with reference to FIG. 12.

Figure 18:
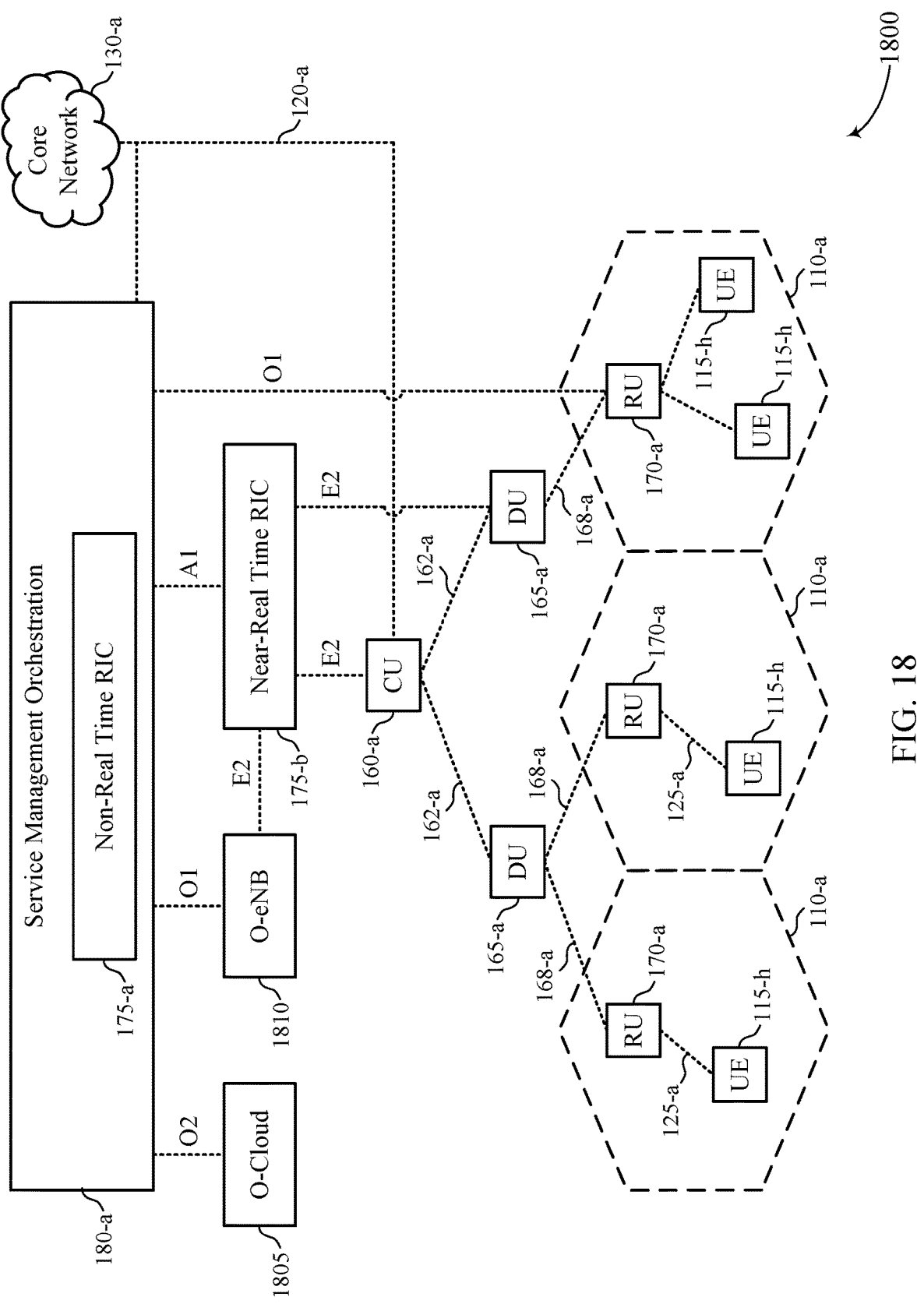
FIG. 18 illustrates an example of a network architecture that supports dynamic adaptation of a sleep cycle for a cell in accordance with one or more aspects of the present disclosure.

FIG. 18 illustrates an example of a network architecture 1800 (e.g., a disaggregated base station architecture, a disaggregated RAN architecture) that supports dynamic adaptation of a sleep cycle for a cell in accordance with one or more aspects of the present disclosure. The network architecture 1800 may illustrate an example for implementing one or more aspects of the wireless communications system 100. The network architecture 1800 may include one or more CUs 160-*a* that may communicate directly with a core network 130-*a* via a backhaul communication link 120-*a*, or indirectly with the core network 130-*a* through one or more disaggregated network entities 105 (e.g., a Near-RT RIC 175-*b* via an E2 link, or a Non-RT RIC 175-*a* associated with an SMO 180-*a* (e.g., an SMO Framework), or both). A CU 160-*a* may communicate with one or more DUs 165-*a* via respective midhaul communication links 162-*a* (e.g., an F1 interface). The DUs 165-*a* may communicate with one or more RUs 170-*a* via respective fronthaul communication links 168-*a*. The RUs 170-*a* may be associated with respective coverage areas 110-*a* and may communicate with UEs 115-*h* via one or more communication links 125-*a*. In some implementations, a UE 115-*h* may be simultaneously served by multiple RUs 170-*a*.

Each of the network entities 105 of the network architecture 1800 (e.g., CUs 160-*a*, DUs 165-*a*, RUs 170-*a*, Non-RT RICs 175-*a*, Near-RT RICs 175-*b*, SMOs 180-*a*, Open Clouds (O-Clouds) 1805, Open eNBs (O-eNBs) 1810) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-*a* may host one or more higher layer control functions. Such control functions may include RRC, PDCP, SDAP, or the like. Each control function may be implemented with an interface configured to communicate signals with other control functions hosted by the CU 160-*a*. A CU 160-*a* may be configured to handle user plane functionality (e.g., CU-UP), control plane functionality (e.g., CU-CP), or a combination thereof. In some examples, a CU 160-*a* may be logically split into one or more CU-UP units and one or more CU-CP units. A CU-UP unit may communicate bidirectionally with the CU-CP unit via an interface, such as an E1 interface when implemented in an O-RAN configuration. A CU 160-*a* may be implemented to communicate with a DU 165-*a*, as necessary, for network control and signaling.

A DU 165-*a* may correspond to a logical unit that includes one or more functions (e.g., base station functions, RAN functions) to control the operation of one or more RUs 170-*a*. In some examples, a DU 165-*a* may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-*a* may further host one or more low PHY layers. Each layer may be implemented with an interface configured to communicate signals with other layers hosted by the DU 165-*a*, or with control functions hosted by a CU 160-*a*.

In some examples, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-*a* may be implemented to handle over the air (OTA) communication with one or more UEs 115-*h*. In some implementations, real-time and non-real-time aspects of control and user plane communication with the RU(s) 170-*a* may be controlled by the corresponding DU 165-*a*. In some examples, such a configuration may enable a DU 165-*a* and a CU 160-*a* to be implemented in a cloud-based RAN architecture, such as a vRAN architecture.

The SMO 180-*a* may be configured to support RAN deployment and provisioning of non-virtualized and virtualized network entities 105. For non-virtualized network entities 105, the SMO 180-*a* may be configured to support the deployment of dedicated physical resources for RAN coverage requirements which may be managed via an operations and maintenance interface (e.g., an O1 interface). For virtualized network entities 105, the SMO 180-*a* may be configured to interact with a cloud computing platform (e.g., an O-Cloud 1805) to perform network entity life cycle management (e.g., to instantiate virtualized network entities 105) via a cloud computing platform interface (e.g., an O2 interface). Such virtualized network entities 105 can include, but are not limited to, CUs 160-*a*, DUs 165-*a*, RUs 170-*a*, and Near-RT RICs 175-*b*. In some implementations, the SMO 180-*a* may communicate with components configured in accordance with a 4G RAN (e.g., via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-*b*. The Non-RT RIC 175-*a* may be coupled to or communicate with (e.g., via an A1 interface) the Near-RT RIC 175-*b*. The Near-RT RIC 175-*b* may be configured to include a logical function that enables near-real-time control and optimization of RAN elements and resources via data collection and actions over an interface (e.g., via an E2 interface) connecting one or more CUs 160-*a*, one or more DUs 165-*a*, or both, as well as an O-eNB 1810, with the Near-RT RIC 175-*b*.

In some examples, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some examples, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (e.g., reconfiguration via O1) or via generation of RAN management policies (e.g., A1 policies).

The following provides an overview of aspects of the present disclosure:

Aspect 1: A method for wireless communications at a UE, comprising: receiving control signaling that indicates a sleep cycle of a network entity over which the network entity alternates between an active time duration and an inactive time duration, a wakeup signal occasion within a first active time duration of the sleep cycle for communication of a wakeup signal, and a time and frequency resource within the first active time duration of the sleep cycle that occurs after the wakeup signal occasion; and receiving, via the time and frequency resource, a first control message comprising an indication of a dynamic adaptation to the sleep cycle and indicating a power state of the network entity.

Aspect 2: The method of aspect 1, further comprising: monitoring, via the time and frequency resource, for a control message indicating the power state of the network entity.

Aspect 3: The method of any of aspects 1 through 2, further comprising: transmitting, to the network entity during the wakeup signal occasion, a first wakeup signal during the first active time duration, the receiving of the first control message comprising the indication of the dynamic adaptation to the sleep cycle is based at least in part on transmitting the first wakeup signal.

Aspect 4: The method of any of aspects 1 through 3, the receiving of the first control message comprising the indication of the dynamic adaptation to the sleep cycle comprising: receiving, via the time and frequency resource, a time offset indication that indicates a time shift to the active time duration of the sleep cycle.

Aspect 5: The method of any of aspects 1 through 4, the receiving of the first control message comprising the indication of the dynamic adaptation to the sleep cycle comprising: receiving, via the time and frequency resource, a time duration increase indication that indicates an increased time duration of an upcoming instance of the active time duration of the sleep cycle.

Aspect 6: The method of any of aspects 1 through 5, the receiving of the first control message comprising the indication of the dynamic adaptation to the sleep cycle comprising: receiving the dynamic adaptation that indicates a quantity of instances of the active time duration of the sleep cycle.

Aspect 7: The method of any of aspects 1 through 6, the first control message comprising downlink control information, the method further comprising: receiving, the first control message comprising the indication of the dynamic adaptation to the sleep cycle, the downlink control information comprising one or more bit values that indicates a type of the dynamic adaptation of the sleep cycle.

Aspect 8: The method of aspect 7, further comprising: receiving, a second control message comprising an indication of a table that associates respective bit values to a respective type of dynamic adaptation of the sleep cycle of a plurality of dynamic sleep cycle adaptation types.

Aspect 9: The method of any of aspects 1 through 8, the receiving of the first control message comprising: receiving the first control message via a physical downlink shared channel.

Aspect 10: A method for wireless communications at a network entity, comprising: transmitting control signaling that indicates a sleep cycle of the network entity over which the network entity alternates between an active time duration and an inactive time duration, a wakeup signal occasion within a first active time duration of the sleep cycle for communication of a wakeup signal, and a time and frequency resource within the first active time duration of the sleep cycle that occurs after a wakeup signal occasion; and transmitting, via the time and frequency resource, a first control message comprising an indication of a dynamic adaptation to the sleep cycle and indicating a power state of the network entity.

Aspect 11: The method of aspect 10, further comprising: monitoring, via the time and frequency resource, for a wake up signal from one or more user equipments (UEs).

Aspect 12: The method of any of aspects 10 through 11, further comprising: receiving, during the wakeup signal occasion, at least one wakeup signal from one or more user equipments (UEs) of a plurality of UEs during the first active time duration, the transmitting of the first control message comprising the indication of the dynamic adaptation to the sleep cycle being based at least in part on receiving the at least one wakeup signal from the one or more UEs.

Aspect 13: An apparatus for wireless communications at a UE, comprising a processor; memory coupled with the processor; and instructions stored in the memory and executable by the processor to cause the apparatus to perform a method of any of aspects 1 through 9.

Aspect 14: An apparatus for wireless communications at a UE, comprising at least one means for performing a method of any of aspects 1 through 9.

Aspect 15: A non-transitory computer-readable medium storing code for wireless communications at a UE, the code comprising instructions executable by a processor to perform a method of any of aspects 1 through 9.

Aspect 16: An apparatus for wireless communications at a network entity, comprising a processor; memory coupled with the processor; and instructions stored in the memory and executable by the processor to cause the apparatus to perform a method of any of aspects 10 through 12.

Aspect 17: An apparatus for wireless communications at a network entity, comprising at least one means for performing a method of any of aspects 10 through 12.

Aspect 18: A non-transitory computer-readable medium storing code for wireless communications at a network entity, the code comprising instructions executable by a processor to perform a method of any of aspects 10 through 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database, or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE) in a wireless network, comprising:
   one or more processors; and
   memory coupled with the one or more processors and configured to cause the UE to:
      receive control signaling that indicates a sleep cycle of a network entity over which the network entity alternates between an active time duration and an inactive time duration, that indicates a wakeup signal occasion within a first active time duration of the sleep cycle for communication of a wakeup signal, and that indicates a time and frequency resource within the first active time duration of the sleep cycle that occurs after the wakeup signal occasion; and
      receive, via the time and frequency resource, a first control message that comprises an indication of a dynamic adaptation to the sleep cycle and a power state of the network entity.

2. The apparatus of claim 1, wherein the one or more processors are further configured to cause the UE to:
   monitor, via the time and frequency resource, for the first control message that indicates the power state of the network entity.

3. The apparatus of claim 1, wherein the one or more processors are further configured to cause the UE to:
   transmit, to the network entity during the wakeup signal occasion, a first wakeup signal during the first active time duration, wherein the first control message that comprises the indication of the dynamic adaptation to the sleep cycle is received based at least in part on the first wakeup signal.

4. The apparatus of claim 1, wherein, to receive the first control message that comprises the indication of the dynamic adaptation to the sleep cycle, the one or more processors are configured to cause the UE to:
   receive, via the time and frequency resource, a time offset indication that indicates a time shift to the active time duration of the sleep cycle.

5. The apparatus of claim 1, wherein, to receive the first control message that comprises the indication of the dynamic adaptation to the sleep cycle, the one or more processors are configured to cause the UE to:
   receive, via the time and frequency resource, a time duration increase indication that indicates an increased time duration of an upcoming instance of the active time duration of the sleep cycle.

6. The apparatus of claim 1, wherein, to receive the first control message that comprises the indication of the dynamic adaptation to the sleep cycle, the one or more processors are configured to cause the UE to:
   receive the dynamic adaptation that indicates a quantity of instances of the active time duration of the sleep cycle.

7. The apparatus of claim 1, wherein the first control message comprises downlink control information, and wherein the one or more processors are further configured to cause the UE to:

receive the first control message that comprises the indication of the dynamic adaptation to the sleep cycle, wherein the downlink control information comprises one or more bit values that indicate a type of the dynamic adaptation of the sleep cycle.

8. The apparatus of claim 7, wherein the one or more processors are further configured to cause the UE to:

receive, a second control message that comprises an indication of a table that associates respective bit values to a respective type of dynamic adaptation of the sleep cycle of a plurality of dynamic sleep cycle adaptation types.

9. The apparatus of claim 1, further comprising a transceiver, wherein, to receive the first control message, the one or more processors are configured to cause the UE to:

receive, using the transceiver, the first control message via a physical downlink shared channel.

10. An apparatus for wireless communications at a network entity in a wireless network, comprising:

a one or more processors; and memory coupled with the one or more processors and configured to cause the network entity to:

transmit control signaling that indicates a sleep cycle of the network entity over which the network entity alternates between an active time duration and an inactive time duration, that indicates a wakeup signal occasion within a first active time duration of the sleep cycle for communication of a wakeup signal, and that indicates a time and frequency resource within the first active time duration of the sleep cycle that occurs after the wakeup signal occasion; and transmit, via the time and frequency resource, a first control message that comprises an indication of a dynamic adaptation to the sleep cycle and a power state of the network entity.

11. The apparatus of claim 10, wherein the one or more processors are further configured to cause the network entity to:

monitor, via the time and frequency resource, for one or more wake up signals from one or more user equipments (UEs).

12. The apparatus of claim 10, wherein the one or more processors are further configured to cause the network entity to:

receive, during the wakeup signal occasion, one or more wakeup signals from one or more user equipments (UEs) of a plurality of UEs during the first active time duration, wherein the first control message that comprises the indication of the dynamic adaptation to the sleep cycle is transmitted based at least in part on the one or more wakeup signals from the one or more UEs.

13. The apparatus of claim 10, wherein, to transmit the first control message that comprises the indication of the dynamic adaptation to the sleep cycle, the one or more processors are configured to cause the network entity to:

transmit, via the time and frequency resource, a time offset indication that indicates a time shift to an upcoming instance of the active time duration of the sleep cycle.

14. The apparatus of claim 10, wherein, to transmit the first control message that comprises the indication of the dynamic adaptation to the sleep cycle, the one or more processors are configured to cause the network entity to:

transmit, via the time and frequency resource, a time duration increase indication that indicates an increased time duration of an upcoming instance of the active time duration of the sleep cycle.

15. The apparatus of claim 10, wherein, to transmit the first control message that comprises the indication of the dynamic adaptation to the sleep cycle, the one or more processors are configured to cause the network entity to:

transmit the dynamic adaptation that indicates a quantity of instances of the active time duration of the sleep cycle.

16. The apparatus of claim 10, wherein the first control message comprises downlink control information, and wherein the one or more processors are further configured to cause the network entity to:

transmit the first control message that comprises the indication of the dynamic adaptation to the sleep cycle, wherein the downlink control information comprises one or more bit values that indicate a type of the dynamic adaptation of the sleep cycle.

17. The apparatus of claim 16, wherein the one or more processors are further configured to cause the network entity to:

transmit, a second control message that comprises an indication of a table that associates respective bit values to a respective type of dynamic adaptation of the sleep cycle of a plurality of dynamic sleep cycle adaptation types.

18. The apparatus of claim 10, further comprising a transceiver, wherein, to transmit the first control message, the one or more processors are configured to cause the network entity to:

transmit, using the transceiver, the first control message via a physical downlink shared channel.

19. A method for wireless communications at a user equipment (UE), comprising:

receiving control signaling that indicates a sleep cycle of a network entity over which the network entity alternates between an active time duration and an inactive time duration, that indicates a wakeup signal occasion within a first active time duration of the sleep cycle for communication of a wakeup signal, and that indicates a time and frequency resource within the first active time duration of the sleep cycle that occurs after the wakeup signal occasion; and receiving, via the time and frequency resource, a first control message comprising an indication of a dynamic adaptation to the sleep cycle and a power state of the network entity.

20. The method of claim 19, further comprising:

monitoring, via the time and frequency resource, for the first control message that indicates the power state of the network entity.

21. The method of claim 19, further comprising:

transmitting, to the network entity during the wakeup signal occasion, a first wakeup signal during the first active time duration, wherein the receiving of the first control message comprising the indication of the dynamic adaptation to the sleep cycle is based at least in part on transmitting the first wakeup signal.

22. The method of claim 19, wherein the receiving of the first control message comprising the indication of the dynamic adaptation to the sleep cycle comprises:

receiving, via the time and frequency resource, a time offset indication that indicates a time shift to the active time duration of the sleep cycle.

23. The method of claim 19, wherein the receiving of the first control message comprising the indication of the dynamic adaptation to the sleep cycle comprises:

receiving, via the time and frequency resource, a time duration increase indication that indicates an increased time duration of an upcoming instance of the active time duration of the sleep cycle.

24. The method of claim 19, wherein the receiving of the first control message comprising the indication of the dynamic adaptation to the sleep cycle comprises:

receiving the dynamic adaptation that indicates a quantity of instances of the active time duration of the sleep cycle.

25. The method of claim 19, wherein the first control message comprises downlink control information, the method further comprising:

receiving, the first control message that comprises the indication of the dynamic adaptation to the sleep cycle, wherein the downlink control information comprises one or more bit values that indicate a type of the dynamic adaptation of the sleep cycle.

26. The method of claim 25, further comprising:

receiving, a second control message comprising an indication of a table that associates respective bit values to a respective type of dynamic adaptation of the sleep cycle of a plurality of dynamic sleep cycle adaptation types.

27. The method of claim 19, wherein the receiving of the first control message comprises:

receiving the first control message via a physical downlink shared channel.

28. A method for wireless communications at a network entity, comprising:

transmitting control signaling that indicates a sleep cycle of the network entity over which the network entity alternates between an active time duration and an inactive time duration, that indicates a wakeup signal occasion within a first active time duration of the sleep cycle for communication of a wakeup signal, and that indicates a time and frequency resource within the first active time duration of the sleep cycle that occurs after the wakeup signal occasion; and transmitting, via the time and frequency resource, a first control message comprising an indication of a dynamic adaptation to the sleep cycle and a power state of the network entity.

29. The method of claim 28, further comprising:

monitoring, via the time and frequency resource, for one or more wake up signals from one or more user equipments (UEs).

30. The method of claim 28, further comprising:

receiving, during the wakeup signal occasion, one or more wakeup signals from one or more user equipments (UEs) of a plurality of UEs during the first active time duration, wherein the transmitting of the first control message that comprises the indication of the dynamic adaptation to the sleep cycle is based at least in part on receiving the one or more wakeup signals from the one or more UEs.

* * * * *